United States Patent
Kim et al.

(10) Patent No.: US 10,634,307 B2
(45) Date of Patent: Apr. 28, 2020

(54) LAMP FOR VEHICLE

(71) Applicant: SL Corporation, Daegu (KR)

(72) Inventors: Jongwoon Kim, Gyeongsangbuk-do (KR); Nakjung Choi, Gyeongsangbuk-do (KR); Hyeongdo Kim, Gyeongsangbuk-do (KR); Kihae Shin, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/123,861

(22) Filed: Sep. 6, 2018

(65) Prior Publication Data

US 2020/0080704 A1    Mar. 12, 2020

(51) Int. Cl.
*F21S 43/241*    (2018.01)
*B60Q 1/00*    (2006.01)
*F21S 43/14*    (2018.01)

(52) U.S. Cl.
CPC .......... *F21S 43/241* (2018.01); *B60Q 1/0011* (2013.01); *F21S 43/14* (2018.01)

(58) Field of Classification Search
CPC .......... F21V 11/02; F21V 11/06; F21V 11/12; F21V 11/14; F21S 43/241; F21S 41/285; B60Q 1/0011
See application file for complete search history.

(56) References Cited

U.S. PATENT DOCUMENTS

| | | | |
|---|---|---|---|
| 6,769,777 B1* | 8/2004 | Dubin | F21V 5/04 |
| | | | 353/38 |
| 10,232,763 B1* | 3/2019 | Eckstein | B60Q 1/16 |
| 2016/0010811 A1* | 1/2016 | Benitez | F21S 41/43 |
| | | | 362/509 |
| 2016/0201867 A1 | 7/2016 | Moser et al. | |
| 2016/0265733 A1* | 9/2016 | Bauer | G02B 3/0006 |
| 2018/0320852 A1* | 11/2018 | Mandl | F21S 41/322 |
| 2018/0335191 A1* | 11/2018 | Stefanov | F21S 41/16 |
| 2019/0072252 A1 | 3/2019 | Moser et al. | |

FOREIGN PATENT DOCUMENTS

| | | |
|---|---|---|
| AT | 517885 A1 | 5/2017 |
| AT | 518905 A1 | 2/2018 |
| CH | 296715 A | 2/1954 |
| DE | 102013202334 B4 | 11/2016 |
| EP | 0738903 A1 | 10/1996 |
| EP | 0738904 A1 | 10/1996 |

\* cited by examiner

*Primary Examiner* — Julie A Bannan
(74) *Attorney, Agent, or Firm* — Nelson Mullins Riley & Scarborough LLP; Kongsik Kim, Esq.

(57) ABSTRACT

The lamp for a vehicle includes a light source part including a light source, a first lens part including a plurality of micro incidence lenses on which light generated from the light source part is incident, a second lens part including a plurality of micro emitting lenses each corresponding to the micro incidence lenses, and a shield part disposed between the first lens part and the second lens part. The shield part includes a plurality of shields configured to block some of the light incident from the micro incidence lenses on the micro emitting lenses. In particular, a center line of the second lens part is disposed to be spaced apart from a center line of the first lens part in at least one of a side direction or a downward direction.

12 Claims, 23 Drawing Sheets

LAMP FOR VEHICLE

BACKGROUND

1. Field of the Disclosure

The present disclosure relates to a lamp for a vehicle, and more specifically, to a lamp for a vehicle configured to reduce loss of light for forming a cutoff line of a beam pattern.

2. Description of the Related Art

Generally, a vehicle includes a lamp with an illumination function of allowing an object disposed near the vehicle to be easily seen when driving during low light conditions (e.g., night), and a signaling function of informing other vehicles or pedestrians of a driving state of the vehicle. For example, a head lamp, a fog lamp, and the like are provided for illumination, and a turn signal lamp, a tail lamp, a brake lamp, a side marker, and the like are provided for signaling.

Among them, the head lamp plays an important role in safe driving by emitting light in the same direction as a driving direction of the vehicle to secure a front view of a driver when the vehicle is driven at night or through a dark place such as a tunnel, or the like. The head lamp forms a beam pattern including a predetermined cutoff line to prevent glare which is generated toward a driver of a front vehicle such as an oncoming vehicle, a preceding vehicle, or the like, and in this case, some of the light emitted to the front of the vehicle is blocked to form the cutoff line.

In this case, the light blocked to form the cutoff line of the beam pattern is a cause of light loss, and accordingly, there are limitations to improving light use efficiency. Accordingly, a method capable of improving light use efficiency by reducing the light blocked to form the cutoff line of the beam pattern is required.

SUMMARY

The present disclosure is directed to providing a lamp for a vehicle configured to reduce loss of light due to blockage to form a cutoff line of a beam pattern. It should be noted that objects of the present disclosure are not limited to the above-mentioned objects, and other objects of the present disclosure will be apparent to those skilled in the art from the following descriptions.

A lamp for a vehicle according to an exemplary embodiment of the present disclosure may include a light source part including a light source; a first lens part including a plurality of micro incidence lenses on which light generated from the light source part is incident; a second lens part including a plurality of micro emitting lenses each corresponding to each of the plurality of micro incidence lenses; and a shield part disposed between the first lens part and the second lens part, wherein the shield part includes a plurality of shields configured to block some of the light incident from the plurality of micro incidence lenses on the plurality of micro emitting lenses, wherein a center line which connects centers of an incidence surface and an emitting surface of the second lens part is disposed to be spaced apart from a center line which connects centers of an incidence surface and an emitting surface of the first lens part in at least one of a side direction or a downward direction.

A lamp for a vehicle according to another exemplary embodiment of the present disclosure may include a light source part including a light source; a first lens part including a plurality of micro incidence lenses on which light generated from the light source part is incident; a second lens part including a plurality of micro emitting lenses each corresponding to each of the plurality of micro incidence lenses; and a shield part disposed between the first lens part and the second lens part, wherein the shield part includes a plurality of shields configured to block some of the light incident from the plurality of micro incidence lenses on the plurality of micro emitting lenses. In particular, a light axis of the light source may be disposed to be spaced apart from a center line which connects centers of an incidence surface and an emitting surface of the first lens part in at least one of a side direction or a downward direction.

Other details of the present disclosure are included in the detailed description and accompanying drawings which will be described below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and characteristics of the present disclosure, and a method of achieving the same will be apparent by referring to embodiments which will be described below in detail with the accompanying drawings. However, the present disclosure is not limited to the embodiments which will be described below but may be implemented in various different forms, and the embodiments are provided merely so that the present disclosure is complete and those skilled in the art of the present disclosure can have a complete understanding of the scope of the present disclosure, and the present disclosure is defined only by the scope of the claims. The same reference symbols refer to the same or similar components throughout the description.

Accordingly, in some embodiments, well-known processes, well-known structures, and well-known technologies are not specifically described to avoid ambiguous interpretation of the present disclosure.

Further, terms used herein are only for the purpose of describing particular embodiments and are not intended to limit the present disclosure. Singular forms are intended to also include plural referents unless the context clearly indicates otherwise. It should be further understood that the terms "comprise" and/or "comprising" do not preclude the presence or addition of one or more elements, steps, or operations other than the elements, steps, or operations specifically described. Further, the term "and/or" includes combinations of any or all of the mentioned items.

Further, embodiments which will be disclosed in the description will be described with reference to cross-sectional views and/or schematic views which are ideal exemplary views of the present disclosure. Accordingly, shapes of the exemplary views may change according to a manufacturing technology, an allowable error, and/or the like. Accordingly, the embodiments of the present disclosure are not limited to the particular shapes that are shown but include changes of shapes formed based on a manufacturing process. Further, in each of the views shown in the present disclosure, each of the elements may be expanded or downscaled to be shown for convenience of the description. The same reference symbols refer to the same or similar components throughout the description.

Hereinafter, the present disclosure will be described with reference to the drawings for describing a lamp for a vehicle of exemplary embodiments of the present disclosure.

Figure 1:
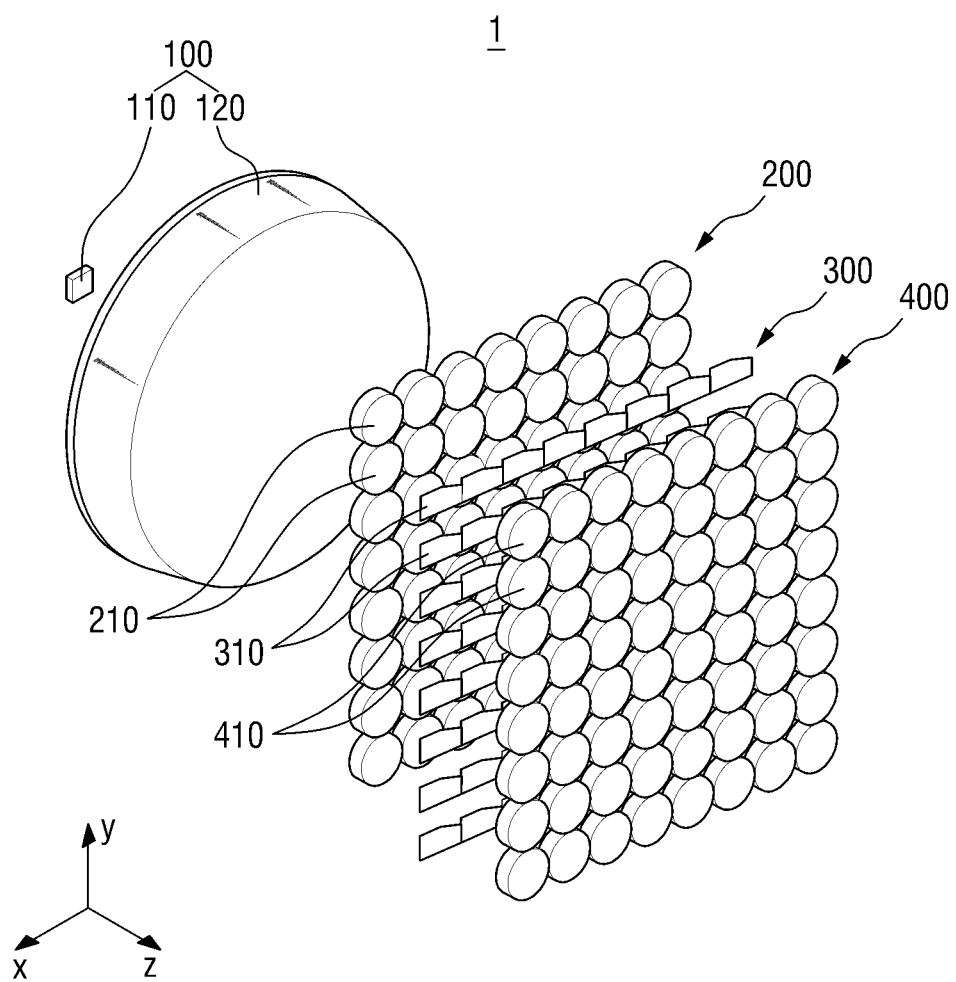
FIG. 1 is a perspective view illustrating a lamp for a vehicle according to an exemplary embodiment of the present disclosure.
Figure 2:
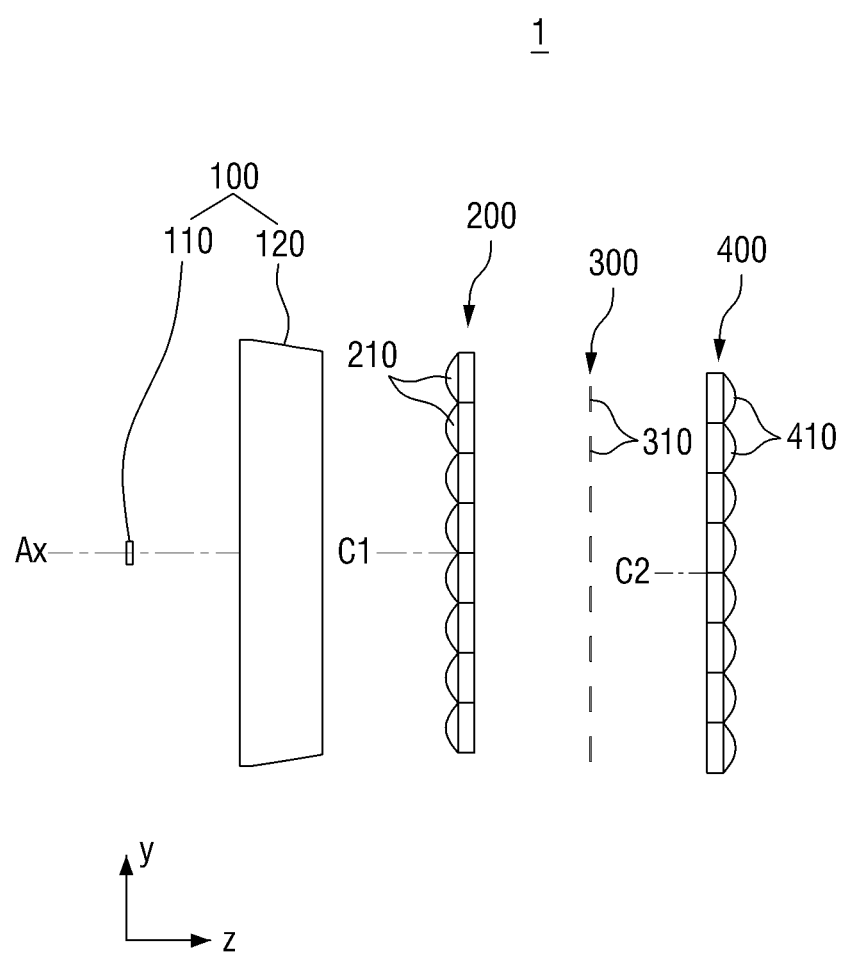
FIG. 2 is a side view illustrating the lamp for a vehicle according to the exemplary embodiment of the present disclosure.
Figure 3:
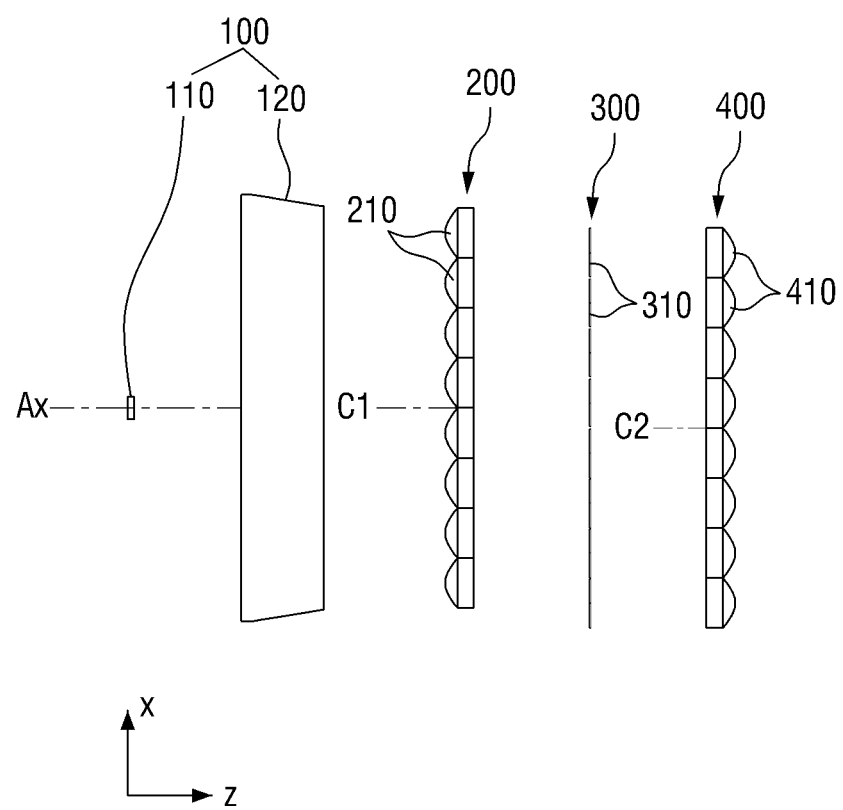
FIG. 3 is a plan view illustrating the lamp for a vehicle according to the exemplary embodiment of the present disclosure.

FIG. 1 is a perspective view illustrating a lamp for a vehicle according to an exemplary embodiment of the present disclosure, FIG. 2 is a side view illustrating the lamp for a vehicle according to the exemplary embodiment of the present disclosure, and FIG. 3 is a plan view illustrating the lamp for a vehicle according to the exemplary embodiment of the present disclosure. Referring to FIGS. 1 to 3, a lamp for a vehicle 1 may include a light source part 100, a first lens part 200, a shield part 300 and a second lens part 400.

The lamp for a vehicle 1 may be used as a head lamp provided to secure a front view for a driver when a vehicle is driven at night or through a dark place such as a tunnel or the like, but the present disclosure is not limited thereto, and the lamp for a vehicle 1 may also be used as any of various lamps installed in a vehicle such as a tail lamp, a brake lamp, a fog lamp, a backup lamp, a turn signal lamp, a daytime driving lamp, and the like in addition to the head lamp. Further, in the exemplary embodiment of the present disclosure, the lamp for a vehicle 1 may form a low beam pattern including a predetermined cutoff line to prevent glare which is generated toward a driver of a front vehicle such as a preceding vehicle, an oncoming vehicle, or the like.

The light source part 100 may include a light source 110 and a light guide part 120. In the exemplary embodiment of the present disclosure, a semiconductor light emitting element such as an light emitting diode (LED) or the like may be used as an example of the light source 110, but the present disclosure is not limited thereto, and various kinds of light sources such as a bulb and the like may be used as the light source 110 in addition to the semiconductor light emitting element. The light guide part 120 may include a center disposed at a light axis Ax of the light source 110 and serve to adjust a light path to allow light generated from the light source 110 to proceed in parallel with the light axis Ax of the light source 110 to be guided to the first lens part 200.

Further, the light guide part 120 may serve to reduce light loss by guiding the light generated from the light source 110 to allow the light to proceed toward the first lens part 200 closely, and may also serve to guide all light to be uniformly incident on the first lens part 200 by adjusting the light path to make the light incident on the first lens part 200 to be substantially parallel with the light axis Ax of the light source 110.

In the exemplary embodiment of the present disclosure, the light guide part 120 may include a collimator lens configured to convert light generated from the light source 110 with respect to the light axis Ax in a predetermined light irradiation range to parallel light parallel with the light axis Ax of the light source 110 to make the light generated from the light source 110 in the predetermined light irradiation range to be incident on the first lens part 200. In particular, the light which passes through a central portion of the light guide part 120 may proceed unimpeded to the first lens part 200, and light which passes through the outside of the central portion (e.g., a peripheral portion) of the light guide part 120 may be bent or reflected by the light guide part 120 to proceed to the first lens part 200.

The first lens part 200 may include a plurality of micro incidence lenses 210, and the plurality of micro incidence lenses 210 may be disposed in an area in which the light generated from the light source part 100 is incident. In particular, incidence surfaces of the plurality of micro incidence lenses 210 may form an incidence surface of the first lens part 200, and emitting surfaces of the plurality of micro incidence lenses 210 may form an emitting surface of the first lens part 200. In the exemplary embodiment of the present disclosure, a center line C1 which connects centers of the incidence surface and the emitting surface in the first lens part 200 may be disposed coincident with the light axis Ax of the light source 110.

The shield part 300 may be disposed between the first lens part 200 and the second lens part 400 and may include a plurality of shields 310 configured to block some of light which passes through the plurality of micro incidence lenses 210 to allow the lamp for a vehicle 1 to form the cutoff line of the beam pattern, and the plurality of shields 310 may include the same shape or different shapes.

The second lens part 400 may include a plurality of micro emitting lenses 410 each corresponding to each of the plurality of micro incidence lenses 210, and the plurality of micro emitting lenses 410 may serve to emit light which passes through the plurality of shields 310 to allow a beam pattern based on usage of the lamp for a vehicle 1 of the present disclosure to be formed in front of the vehicle. Like the above-described first lens part 100, incidence surfaces of the plurality of micro emitting lenses 410 may form an incidence surface of the second lens part 400, and emitting surfaces of the plurality of micro emitting lenses 410 may form an emitting surface of the second lens part 400 in the second lens part 400.

As shown in FIGS. 2 and 3, a center line C2 which connects centers of the incidence surface and the emitting surface of the second lens part 400 may be disposed to be spaced apart from the center line C1 of the first lens part 200 in at least one direction among a side direction and a downward direction in the above-described lamp for a vehicle 1 of the present disclosure.

Since the lamp for a vehicle 1 may be used as the head lamp, a z-axis may be understood to show a front or forward direction of the vehicle, an x-axis may be understood to show a side direction (a lateral direction) of the vehicle, and a y-axis may be understood to show a vertical direction of the vehicle in FIGS. 2 and 3.

A case in which the center line C2 of the second lens part 400 is disposed to be spaced apart from the center line C1 of the first lens part 200 in at least one direction among the side direction and the downward direction may be understood as a case in which the plurality of micro emitting lenses 410 each corresponding to each of the plurality of micro incidence lenses 210 are disposed to be spaced apart from a previous location in at least one direction among a side direction and a downward direction compared with a case in which the center line C2 of the second lens part 400 is coincident with the center line C1 of the first lens part 200.

Although examples of the plurality of micro incidence lenses 210 and the plurality of micro emitting lenses 410 are described to correspond one to one as aspheric lenses in the exemplary embodiment of the present disclosure, they are not limited thereto, and the plurality of micro incidence lenses 210 and the plurality of micro emitting lenses 410 may correspond one to one, one to many, many to one, or many to many based on sizes and shapes thereof.

Figure 4:
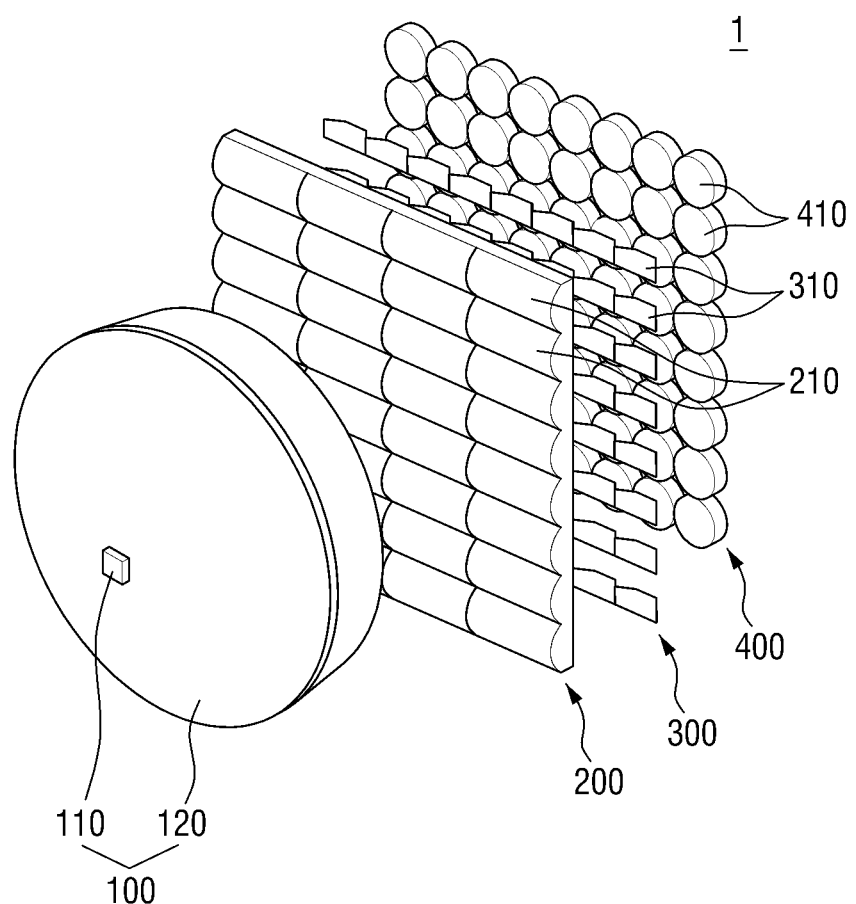
FIGS. 4 and 5 are perspective views illustrating a first lens part and a second lens part according to the exemplary embodiment of the present disclosure.

For example, as shown in FIG. 4, the plurality of micro incidence lenses 210 may be semi-cylindrical shaped lenses configured to extend in one direction, and in this case, at least two of the plurality of micro emitting lenses 410 may correspond to one of the plurality of micro incidence lenses 210.

Figure 5:
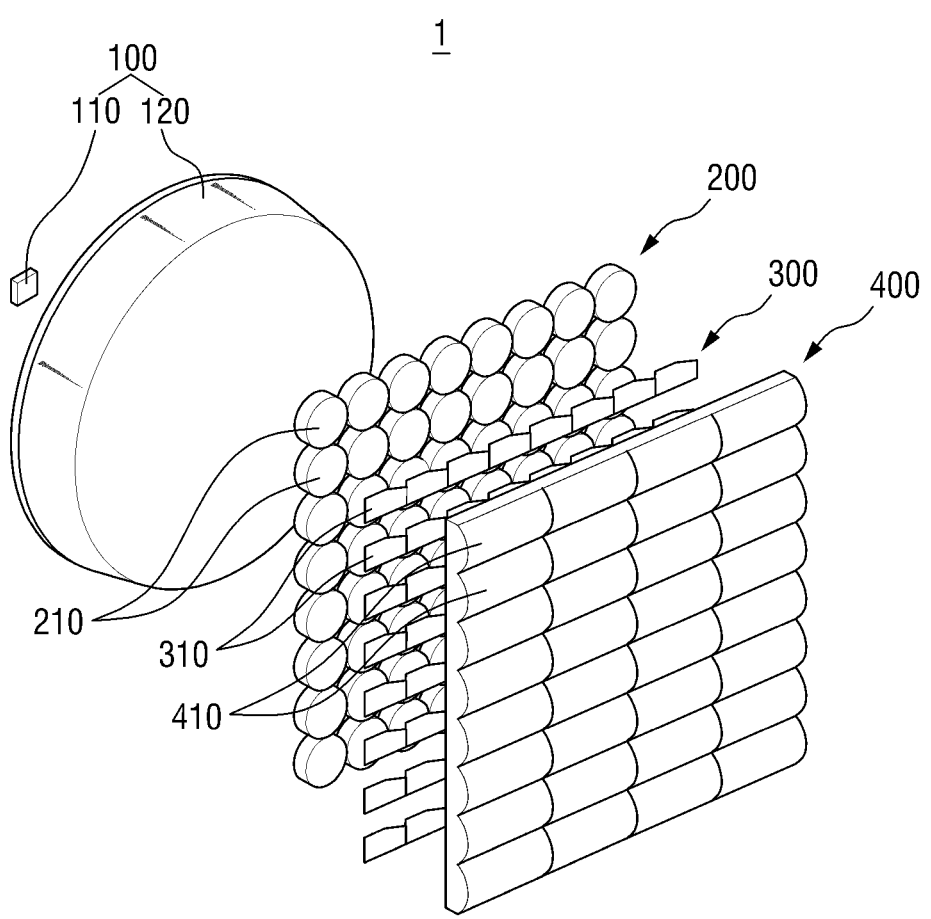

Further, as shown in FIG. 5, the plurality of micro emitting lenses 410 may be semi-cylindrical shaped lenses configured to extend in one direction, and in this case, at least two of the plurality of micro incidence lenses 210 may correspond to one of the plurality of micro emitting lenses 410.

A case in which the plurality of micro incidence lenses 210 are the semi-cylindrical shaped lenses, and a case in which the plurality of micro emitting lenses 410 are the semi-cylindrical shaped lenses have been described above separately in FIGS. 3 and 4, but they are not limited thereto, and both the plurality of micro incidence lenses 210 and the plurality of micro emitting lenses 410 may be the semi-cylindrical shaped lenses.

Further, examples of each of the plurality of micro incidence lenses 210 and the plurality of micro emitting lenses 410 are described as the semi-cylindrical shaped lenses configured to extend in the one direction in the above-described FIGS. 3 and 4, but they are not limited thereto, and the plurality of micro incidence lenses 210 and the plurality of micro emitting lenses 410 may include various sizes and shapes based on the beam pattern formed in the lamp for a vehicle 1 of the present disclosure.

Hereinafter, the plurality of micro incidence lenses 210 and the plurality of micro emitting lenses 410 correspond one to one as the aspheric lenses, and an example of each of one micro incidence lens, one shield, and one micro emitting lens that correspond to each other among the plurality of micro incidence lenses 210, the plurality of shields 310, and the plurality of micro emitting lenses 410 will be described in the exemplary embodiment of the present disclosure, and the description may similarly apply to other micro incidence lenses, shields, and micro emitting lenses.

Figure 6:
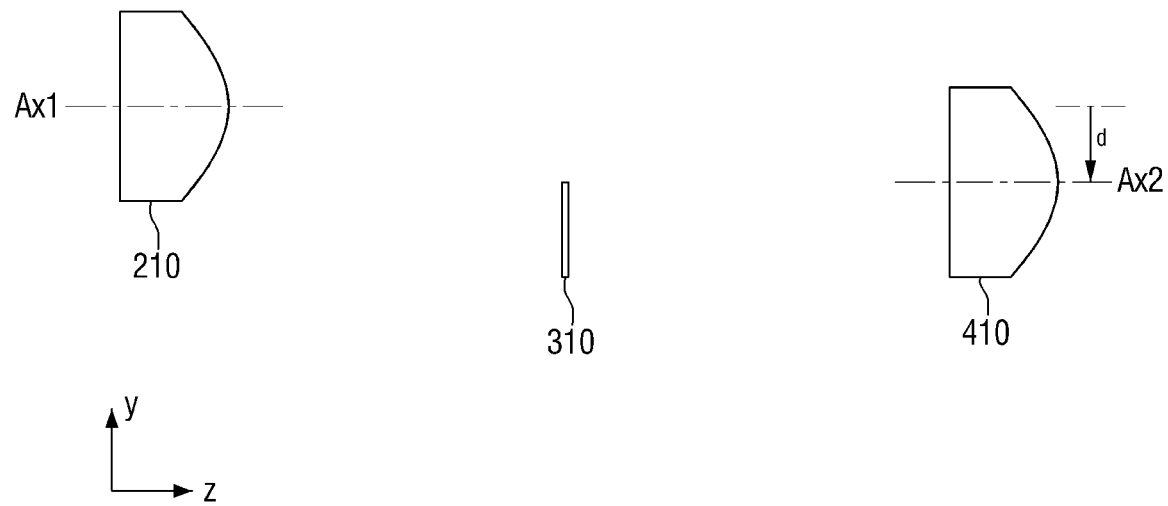
FIGS. 6 and 7 are schematic views illustrating a micro emitting lens disposed to be spaced apart from a center axis of a micro incidence lens according to the exemplary embodiment of the present disclosure.
Figure 7:
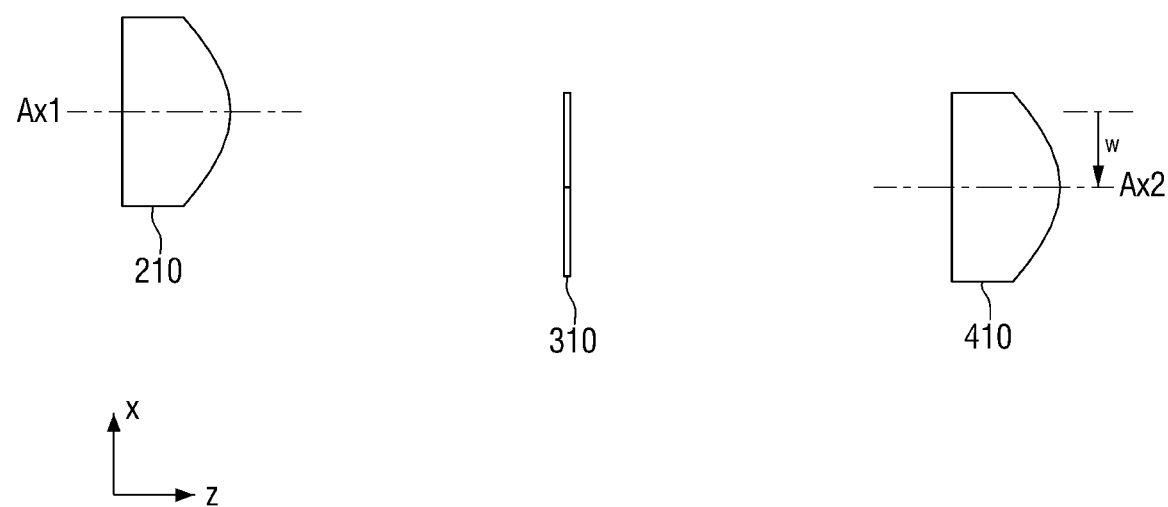

As described above, when the center line C2 of the second lens part 400 is disposed to be spaced apart from the center line C1 of the first lens part 200 in at least one direction among the side direction and the downward direction in the lamp for a vehicle 1 of the present disclosure, a center axis Ax2 of the micro emitting lens 410 may be disposed to be spaced downward from a previous location thereof by a predetermined interval (e.g., a vertical offset) d with respect to a center axis Ax1 of the micro incidence lens 210 as shown in FIG. 6, and the center axis Ax2 of the micro emitting lens 410 may be disposed to be spaced apart from the previous location thereof in a side direction by a predetermined interval (e.g., a horizontal offset or a lateral offset) w with respect to the center axis Ax1 of the micro incidence lens 210 as shown in FIG. 7.

In this case, the center axis Ax1 of the micro incidence lens 210 may refer to an axis which connects the incidence surface and the emitting surface of the micro incidence lens 210, and the center axis Ax2 of the micro emitting lens 410 may refer to an axis which connects the incidence surface and the emitting surface of the micro emitting lens 410.

In the exemplary embodiment of the present disclosure, the center axis Ax2 of the micro emitting lens 410 may be disposed to be spaced apart from the previous location thereof to the right to correspond to the case of left-hand driving (LHD), but the present disclosure is not limited thereto, and the center axis Ax2 of the micro emitting lens 410 may be disposed to be spaced apart from the previous location thereof to the left to correspond to the case of right-hand driving (RHD).

Figure 8:
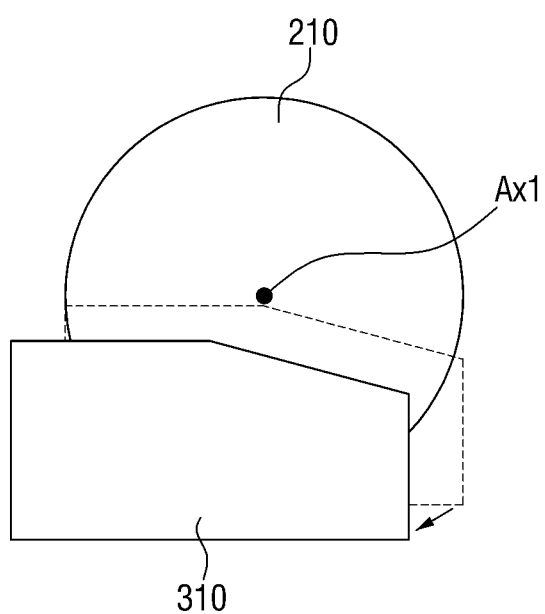
FIG. 8 is a schematic view illustrating a location of a shield according to the exemplary embodiment of the present disclosure.

Meanwhile, when the micro emitting lens 410 is disposed to be spaced apart from the previous location thereof in the side direction and the downward direction by the predetermined intervals d and w, respectively, based on a location of the micro incidence lens 210 as shown in the above-described FIGS. 6 and 7, the shield 310 may also be disposed to be spaced apart from the previous location thereof in a side direction and/or a downward direction like the micro emitting lens 410 as shown in FIG. 8.

In other words, since an upper end of the shield 310 may be required to be disposed at or near the center axis Ax2 of the micro emitting lens 410 to form the cutoff line of the beam pattern, when the micro emitting lens 410 is spaced apart in the side direction and/or the downward direction, the shield 310 may also be displaced in the side direction and/or the downward direction like the micro emitting lens 410, and thus the upper end of the shield 310 may be disposed at or near the center axis Ax2 of the micro emitting lens 410 even when the micro emitting lens 410 is disposed to be spaced apart in the side direction and/or the downward direction.

As described above, the center axis Ax2 of the micro emitting lens 410 may be disposed to be spaced apart in the side direction and/or the downward direction, and the shield 310 may also be displaced in the side direction and/or the downward direction with respect to the center axis Ax1 of the micro incidence lens 210. This is to increase brightness of the beam pattern by reducing the amount of light which is blocked for forming the cutoff line of the beam pattern. The brightness may also be increased by allowing the high intensity light near the center axis Ax1 of the micro incidence lens 210 to be emitted through the micro emitting lens 410 without being blocked by the shield 310.

Figure 9A:
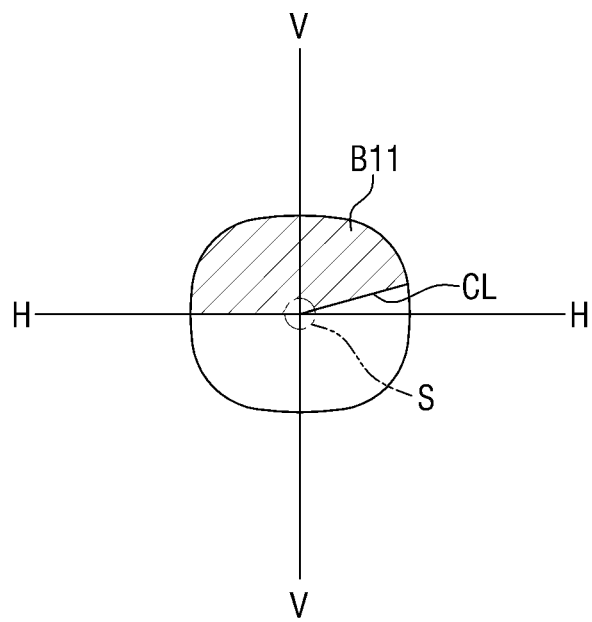
FIGS. 9A and 9B are a schematic views illustrating a beam pattern according to the exemplary embodiment of the present disclosure.
Figure 9B:
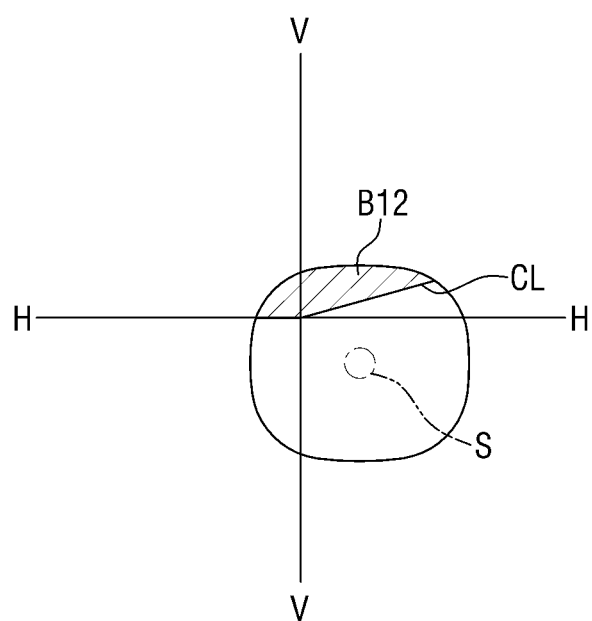

In other words, when the center axis Ax1 of the micro incidence lens 210 and the center axis Ax2 of the micro emitting lens 410 are coincident with each other, as shown in FIG. 9A, since a center S of the beam pattern is disposed at a vanishing point at which a line H-H and a line V-V intersect, an area B11 blocked and lost by the shield 310 to form a cutoff line CL becomes approximately half of the entire beam pattern area. Conversely, in the exemplary embodiment of the present disclosure, since the center axis Ax2 of the micro emitting lens 410 may be disposed to be spaced apart from the center axis Ax1 of the micro incidence lens 210 in the side direction and the downward direction as shown in FIG. 9B, the center S of the beam pattern may be disposed to be spaced apart from the vanishing point at which the line H-H and the line V-V intersect in the side direction and the downward direction, the light loss may be decreased since the area B12 blocked by the shield 310 to form the cutoff line CL may be reduced compared with FIG. 9A.

Further, since the shield 310 may be displaced in the side direction and/or the downward direction to be disposed like the micro emitting lens 410, the light which passes through the center axis Ax1 of the micro incidence lens 210 and includes a high light amount may be prevented from being blocked, and accordingly, since a high illuminance area formed at the center S of the beam pattern may not be blocked by the shield 310 and may be used to form the beam pattern, the brightness of the beam pattern may be increased and the visibility may be improved.

Hereinafter, in the exemplary embodiment of the present disclosure, a predetermined interval by which the center axis Ax2 of the micro emitting lens 410 is spaced apart in the downward direction may be referred to as a first interval d, and a predetermined interval by which the center axis Ax2 of the micro emitting lens 410 is spaced apart in the side direction may be referred to as a second interval w.

An example in which the micro emitting lens 410 is disposed to be spaced apart in the side direction and/or the downward direction has been described in the exemplary embodiment of the present disclosure, but it is merely an example for aiding understanding of the present disclosure, and the micro emitting lens 410 may be disposed to be spaced apart in at least one of the side direction or the downward direction along the beam pattern based on the lamp for a vehicle 1 of the present disclosure without being limited to the above example.

Figure 10:
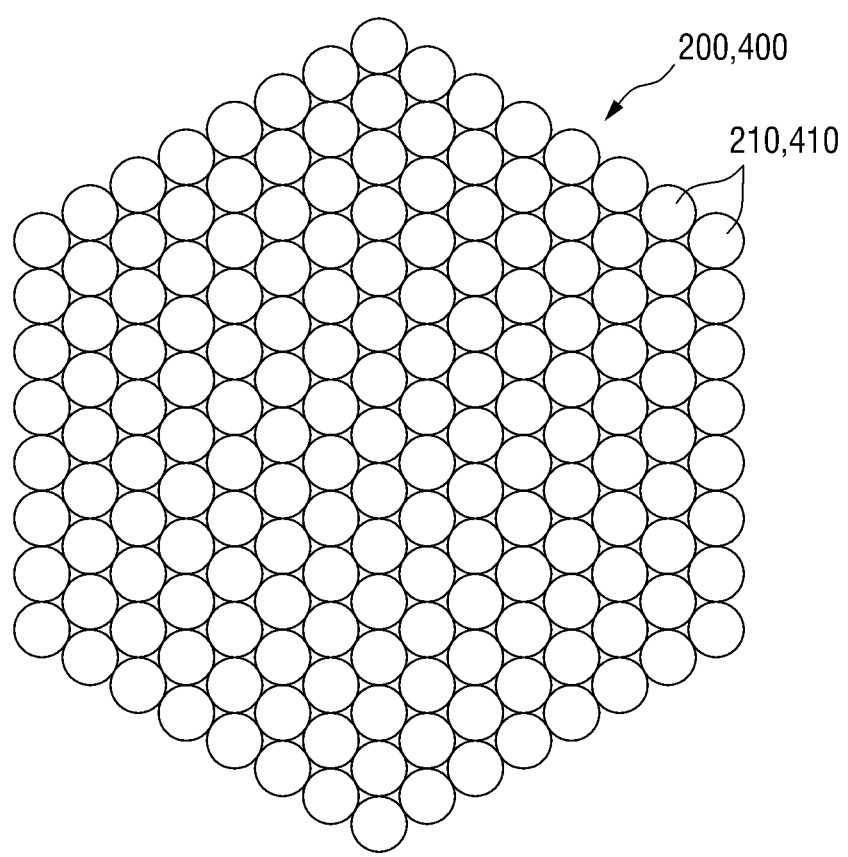
FIG. 10 is a schematic view illustrating the first lens part and the second lens part according to the exemplary embodiment of the present disclosure.

In the above described exemplary embodiment, each of the first lens part 200 and the second lens part 400 may be quadrangular overall, but the geometries of the lenses are not limited thereto, and each of the first lens part 200 and the second lens part 400 may be hexagonal as shown in FIG. 10, in which case the number of each of the micro incidence lenses and the micro emitting lenses included in each of the first lens part 200 and the second lens part 400 may be increased. In this case, since the light which departs from the first lens part 200 and the second lens part 400 in a vertical direction and a lateral direction may be used, light use efficiency may be improved. The shape of each of the first lens part 200 and second lens part 400 of the present disclosure is not limited to the above-described quadrangular shape or hexagonal shape, and may include various shapes capable of forming an optimal beam pattern and improving light use efficiency.

Meanwhile, as described above, the light generated from the light source 110 may be incident on the first lens part 200 in parallel with the light axis Ax of the light source 110 by the light guide part 120, in which case the light incident on each of the plurality of micro incidence lenses 210 may be incident on each of the plurality of micro emitting lenses 410 through a focus surface. The focus surface may be a virtual surface that includes a rear focus of each of the plurality of micro emitting lenses 410 disposed between the micro incidence lenses 210 and the plurality of micro emitting lenses 410.

In this case, the light incident on each of the plurality of micro incidence lenses 210 may be incident on the plurality of micro emitting lenses 410 passing through and corresponding to at least one focus included in the focus surface based on a sort of the lens. For example, when the plurality of micro incidence lenses 210 and the plurality of micro emitting lenses 410 include the aspheric lenses of the same diameter, the plurality of micro incidence lenses 210 and the plurality of micro emitting lenses 410 may correspond to each other one to one, in which case the light incident on each of the plurality of micro incidence lenses 210 may pass through a rear focus of each of the plurality of micro emitting lenses 410.

Further, when the plurality of micro incidence lenses 210 are the semi-cylindrical shaped lenses configured to extend in the one direction, a plurality of micro emitting lenses arranged in a direction in which the semi-cylindrical shaped lenses extend may each correspond to each of the plurality of micro incidence lenses 210. In this case, the light incident on each of the plurality of micro incidence lenses 210 may pass through a rear focus of each of the plurality of micro emitting lenses which are arranged in the direction in which the semi-cylindrical shaped lenses extend.

Meanwhile, the light incident from the light source part 100 on the first lens part 200 may not be incident in parallel with the light axis Ax of the light source 110 when it is at a remote distance from the light axis Ax.

In particular, the light generated from the light source 110 may form a predetermined light emitting angle with respect to the light axis Ax. When the light which proceeds with a large angle from the light axis Ax of the light source 110 among the light generated from the light source 110 is at a remote distance from the light axis Ax of the light source 110, since adjusting the light path by the light guide part 120 to make the light path to be parallel with the light axis Ax may be more difficult than the light which proceeds with a small angle from the light axis Ax of the light source 110, the light which passes through the light guide part 120 may be incident on the first lens part 200 not in parallel with the light axis Ax of the light source 110 but with a predetermined angle from the light axis Ax of the light source 110. In this case, the light which proceeds by passing through the micro incidence lens may proceed with a predetermined angle from the light axis Ax of the light source 110.

In other words, when the center axes Ax2 of the plurality of micro emitting lenses 410 are disposed to be spaced apart in the side direction and the downward direction at the same interval, although light is incident on the micro emitting lens disposed at a central portion of the second lens part 400 in parallel with the light axis Ax of the light source 110, in micro emitting lenses disposed at lateral ends and vertical ends with respect to the center portion of the second lens part 400, light is incident with a predetermined angle with respect to the light axis Ax of the light source 110, and thus some of the light which passes through the micro incidence lens may not be incident.

In view of the foregoing, in the exemplary embodiment of the present disclosure, based on a distance spaced apart from the center portion of the second lens part 400, the plurality of micro emitting lenses 410 may be spaced apart in at least one direction among the above-described side direction and downward direction at various intervals to reduce light loss caused by the light that is not incident on the micro emitting lens.

Figure 11:
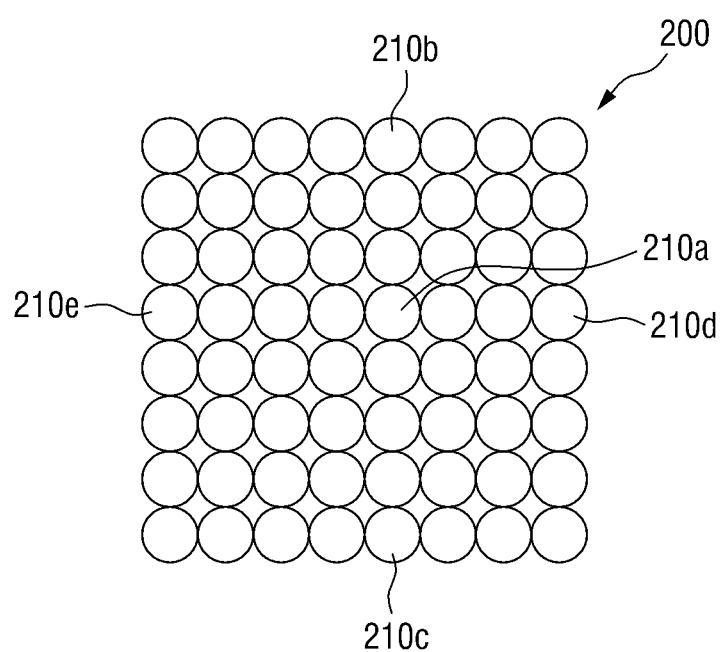
FIG. 11 is a schematic view illustrating micro incidence lenses according to a location of the first lens part according to the exemplary embodiment of the present disclosure.
Figure 12:
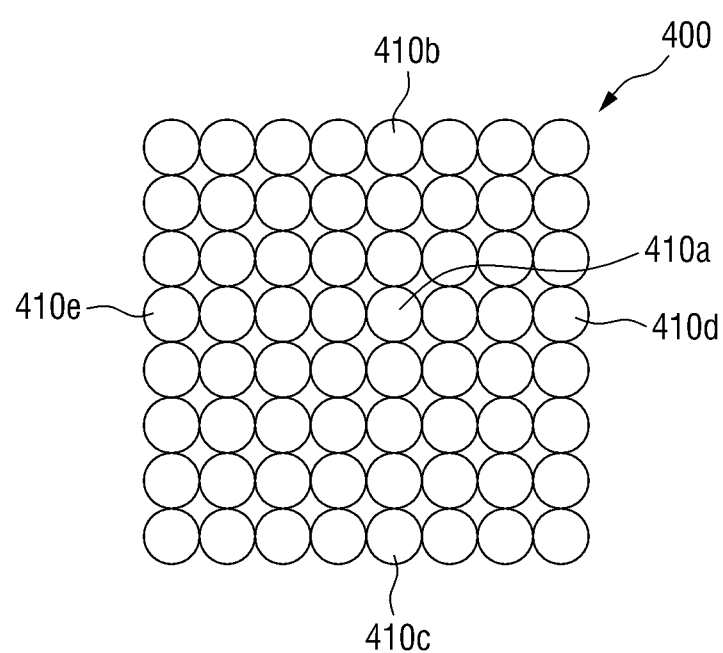
FIG. 12 is a schematic view illustrating micro emitting lenses according to a location of the second lens part according to the exemplary embodiment of the present disclosure.

Hereinafter, in the exemplary embodiment of the present disclosure, as shown in FIG. 11, a micro incidence lens 210a disposed at a center portion of the first lens part 200 may be referred to as a first micro incidence lens, a micro incidence lens 210b disposed at an upper side end of the first lens part 200 may be referred to as a second micro incidence lens, a micro incidence lens 210c disposed at a lower side end of the first lens part 200 may be referred to as a third micro incidence lens, a micro incidence lens 210d disposed at a left side end of the first lens part 200 may be referred to as a fourth micro incidence lens, and a micro incidence lens 210e disposed at a right side end of the first lens part 200 may be referred to as a fifth micro incidence lens. Similarly, as shown in FIG. 12, micro emitting lenses 410a, 410b, 410c, 410d, and 410e disposed at the center portion, an upper side end, a lower side end, a left side end, and a right side end of the second lens part 400 may be referred to as first to fifth micro emitting lenses, respectively.

Figure 13:
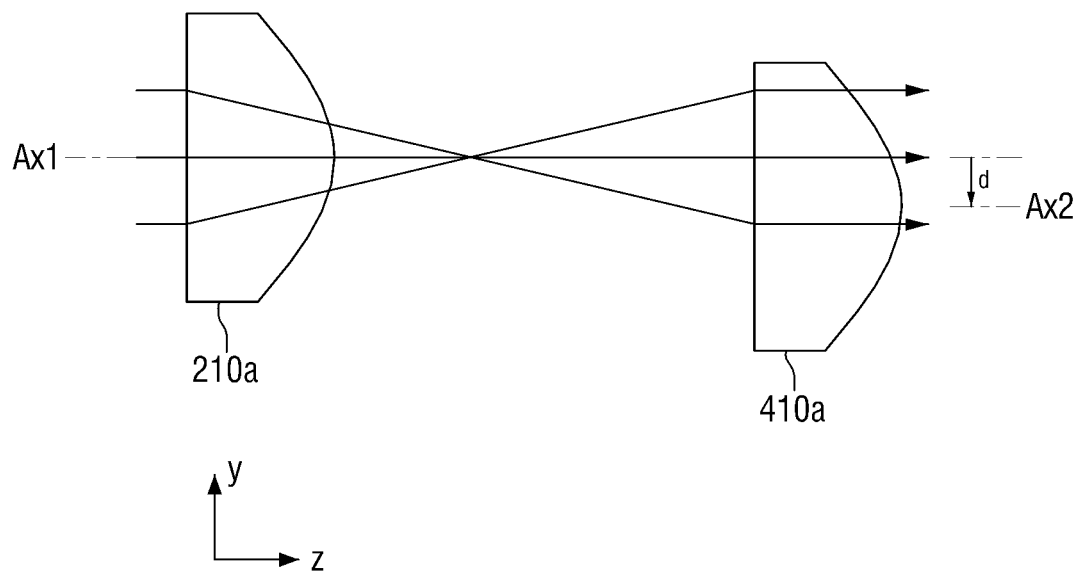
FIGS. 13 and 14 are schematic views illustrating a location of the micro emitting lens disposed at a center portion of the second lens part according to the exemplary embodiment of the present disclosure.
Figure 14:
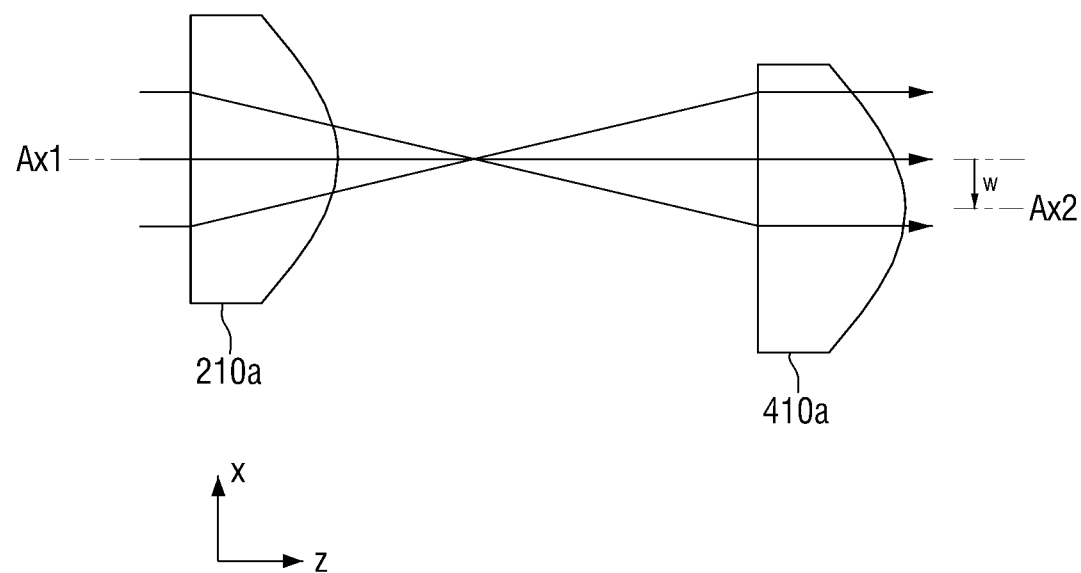

As shown in FIGS. 13 and 14, light may be incident on the first micro incidence lens 210a in parallel with the center axis Ax1, and in this case, light which passes through the first micro incidence lens 210a may be incident on the first micro emitting lens 410a even when the first micro emitting lens 410a is disposed to be spaced apart in a downward direction by a first interval d and in a side direction by a second interval w.

Figure 15:
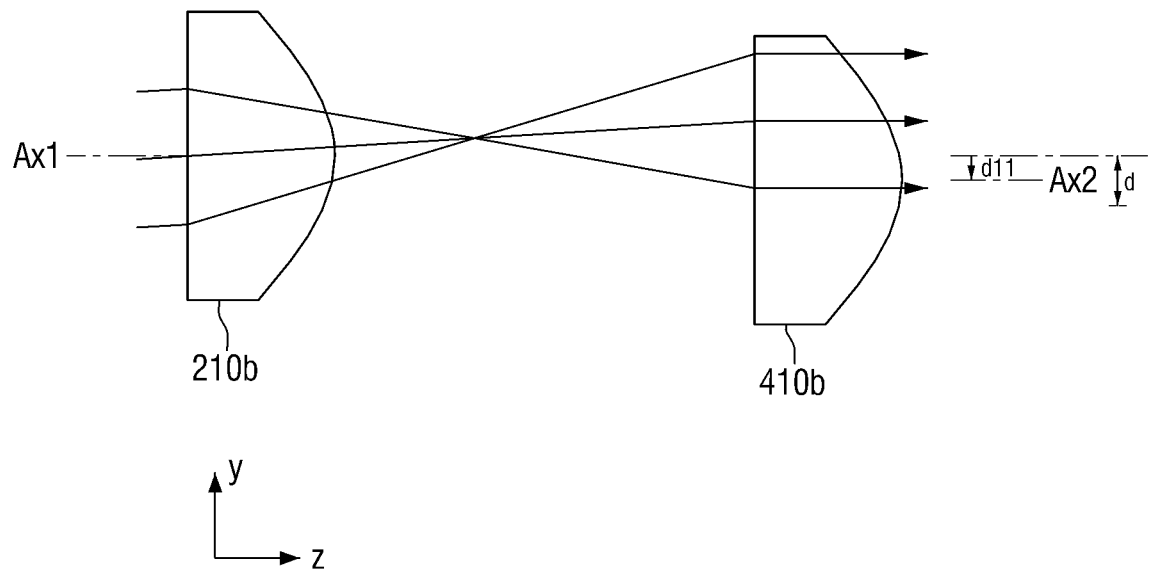
FIGS. 15 and 16 are schematic views illustrating a location of the micro emitting lens disposed at an upper side end of the second lens part according to the exemplary embodiment of the present disclosure.
Figure 16:
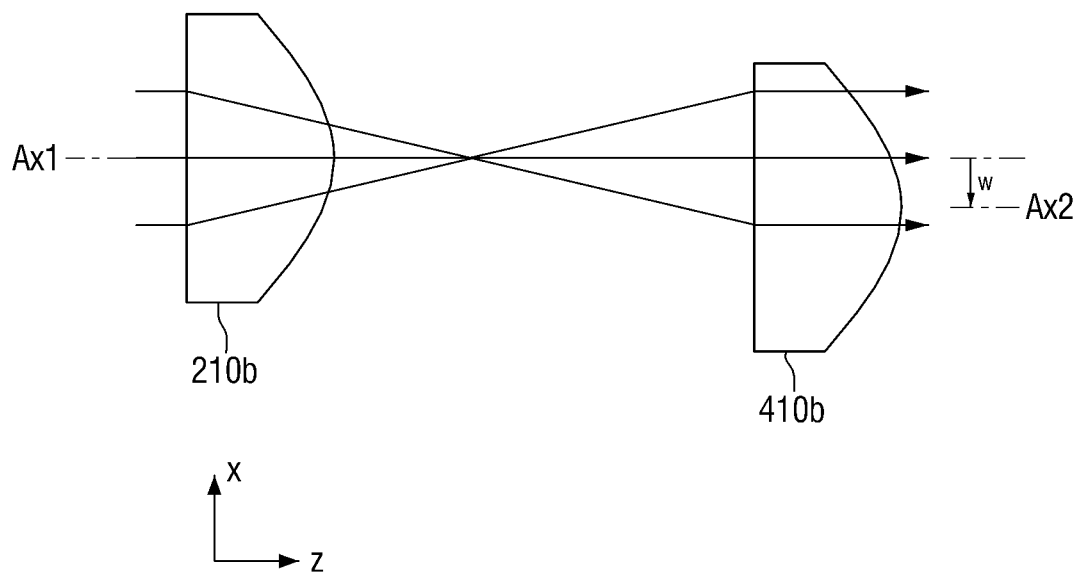

As shown in FIGS. 15 and 16, since light is incident on the second micro incidence lens 210b with a predetermined angle in an upward direction with respect to the center axis Ax1, light which passes through the second micro incidence lens 210b may proceed further in the upward direction compared with the above-described FIG. 13, and in this case, the second micro emitting lens 410b may be spaced apart in a downward direction by an interval d11 which is smaller than the first interval d and in a side direction by the second interval w to allow the light which passes through the second micro incidence lens 210b to be incident on the second micro emitting lens 410b.

In particular, since the light which passes through the second micro incidence lens 210b may face in a relatively upward direction, the second micro emitting lens 410b may be spaced apart in the downward direction by an interval which is smaller than the first interval d to allow the light which passes through the second micro incidence lens 210b to be incident on the second micro emitting lens 410b.

Figure 17:
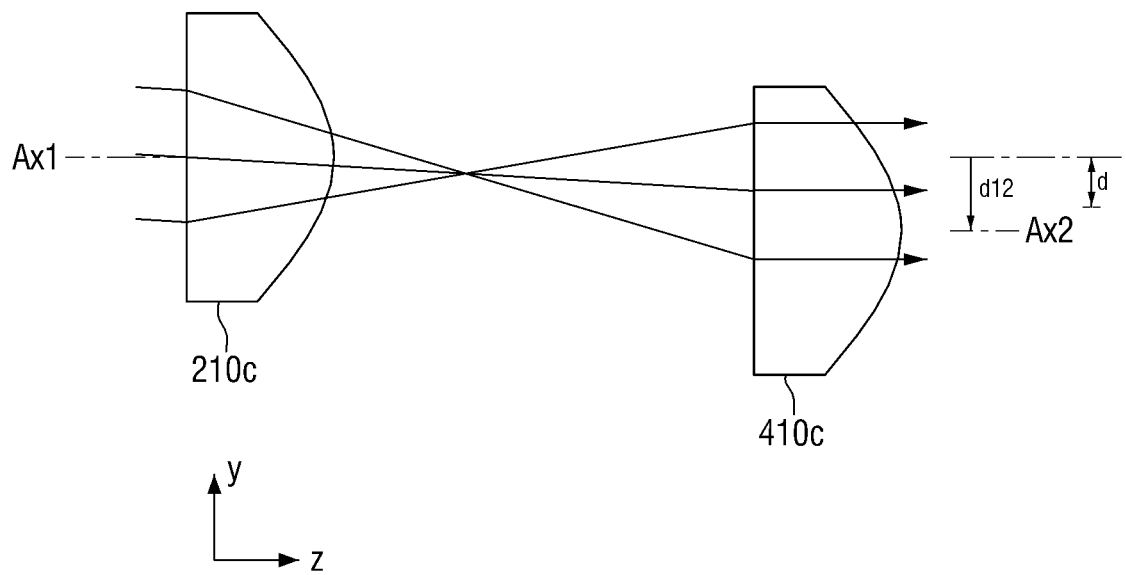
FIGS. 17 and 18 are schematic views illustrating a location of the micro emitting lens disposed at a lower side end of the second lens part according to the exemplary embodiment of the present disclosure.
Figure 18:
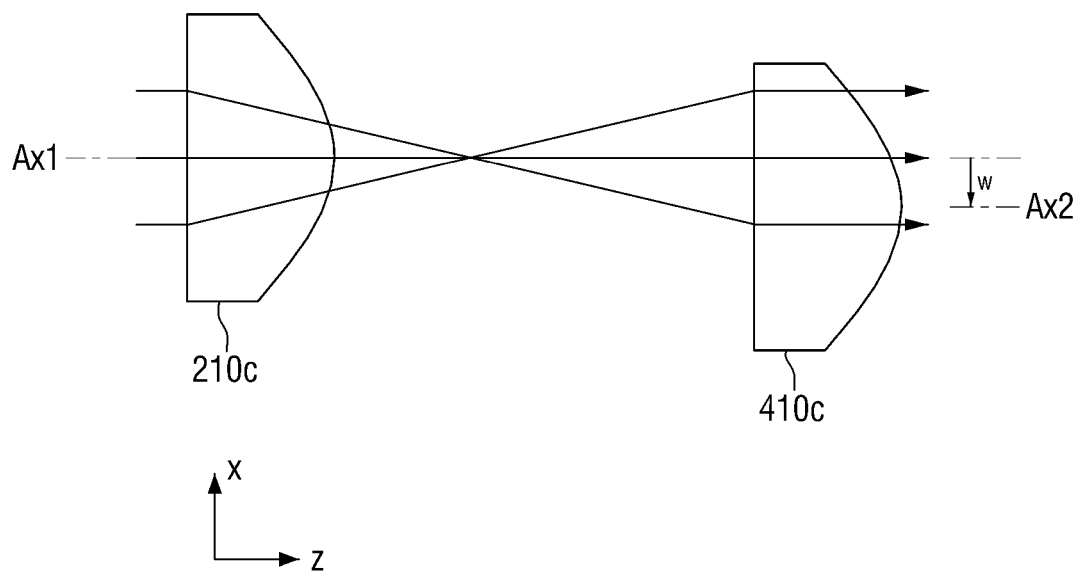

As shown in FIGS. 17 and 18, since light is incident on the third micro incidence lens 210c with a predetermined angle in a downward direction with respect to the center axis Ax1, light which passes through the second micro incidence lens 210b may proceed further in the downward direction compared with the above-described FIG. 13, and in this case, the third micro emitting lens 410c may be spaced apart in the downward direction at an interval d12 which is greater than the first interval d and in a side direction by the second interval w to allow the light which passes through the third micro incidence lens 210c to be incident on the third micro emitting lens 410c.

In particular, since the light which passes through the third micro incidence lens 210c may face in a relatively downward direction, the third micro emitting lens 410c may be spaced apart in the downward direction by an interval which is greater than the first interval d so that the light which passes through the third micro incidence lens 210c may be incident on the third micro emitting lens 410c.

Figure 19:
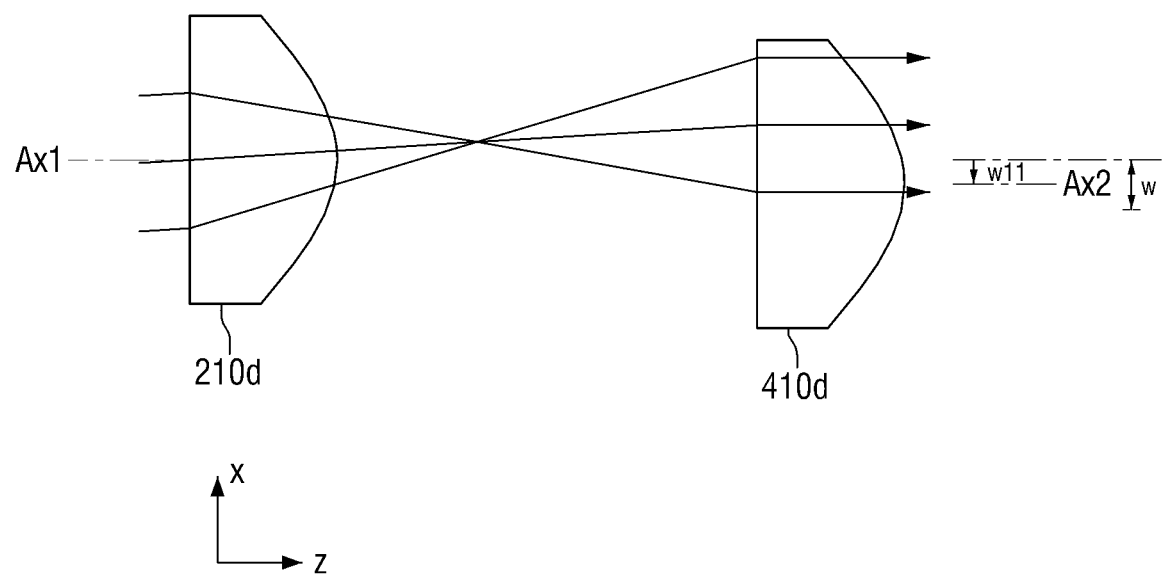
FIGS. 19 and 20 are schematic views illustrating a location of the micro emitting lens disposed at a left side end of the second lens part according to the exemplary embodiment of the present disclosure.
Figure 20:
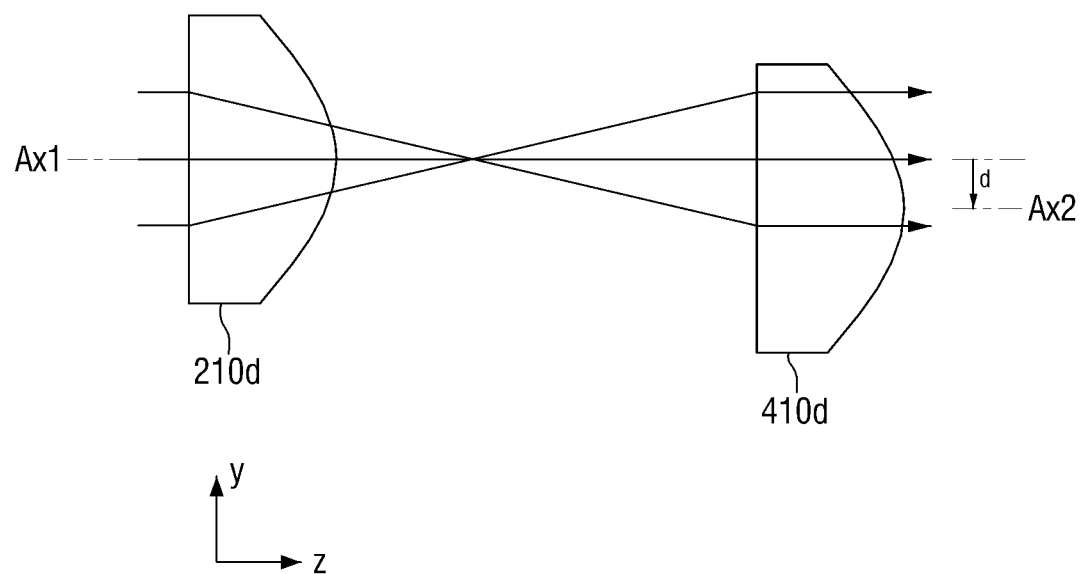

As shown in FIGS. 19 and 20, since light is incident on the fourth micro incidence lens 210d with a predetermined angle in a left direction with respect to the center axis Ax1, light which passes through the fourth micro incidence lens 210d may proceed further in the left direction compared with the above-described FIG. 14, and in this case, the fourth micro emitting lens 410d may be spaced apart in a downward direction by the first interval d and in a side direction by an interval w11 which is smaller than the second interval w to allow the light which passes through the fourth micro incidence lens 210d to be incident on the fourth micro emitting lens 410d.

In particular, since the light which passes through the fourth micro incidence lens 210d may face in a relatively leftward direction, the fourth micro emitting lens 410d may be spaced apart in the side direction by an interval which is smaller than the second interval w to allow the light which passes through the fourth micro incidence lens 210d to be incident on the fourth micro emitting lens 410d.

Figure 21:
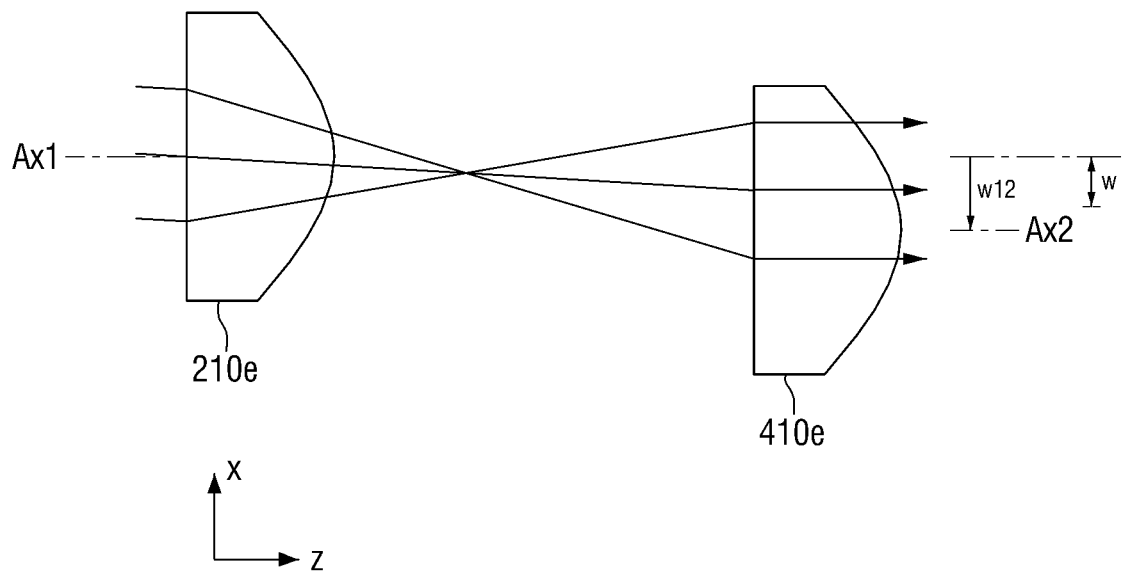
FIGS. 21 and 22 are schematic views illustrating a location of the micro emitting lens disposed at a right side end of the second lens part according to the exemplary embodiment of the present disclosure.
Figure 22:
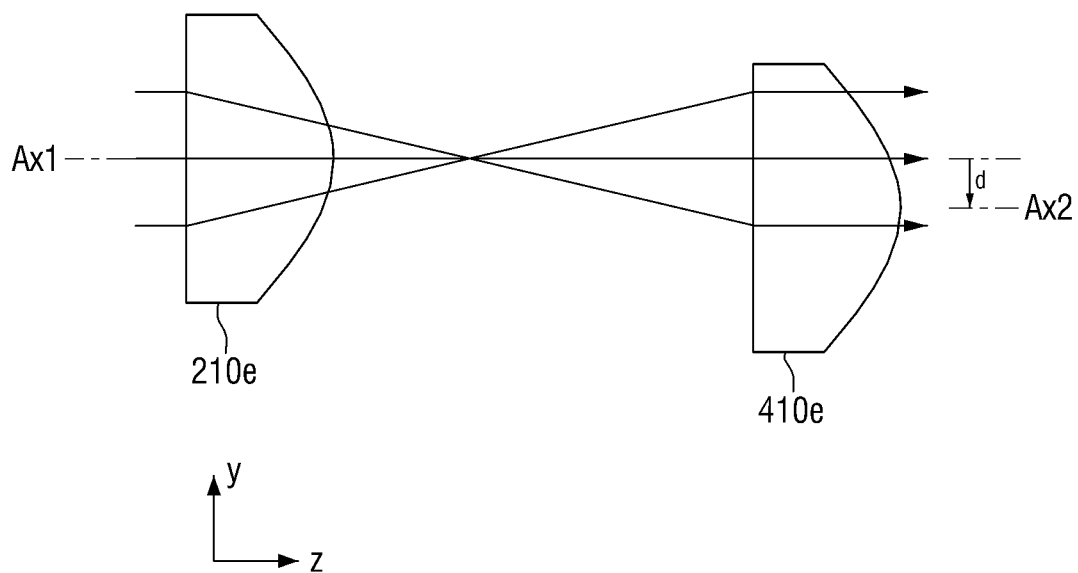

As shown in FIGS. 21 and 22, since light is incident on the fifth micro incidence lens 210e with a predetermined angle in a right direction with respect to the center axis Ax1, light which passes through the fifth micro incidence lens 210e may proceed further in the right direction compared with the above-described FIG. 14, and in this case, the fifth micro emitting lens 410e may be spaced apart in a downward direction by the first interval d and in a side direction at an interval w12 which is greater than the second interval w to allow the light which passes through the fifth micro incidence lens 210e to be incident on the fifth micro emitting lens 410e.

In particular, since the light which passes through the fifth micro incidence lens 210e may face in a relatively rightward direction, the fifth micro emitting lens 410e may be spaced apart in the side direction by an interval which may be greater than the second interval w to allow the light which passes through the fifth micro incidence lens 210e to be incident on the fifth micro emitting lens 410e.

Although an example in which the micro emitting lenses are disposed at each of the center portion of the second lens part 400, and the upper side end, the lower side end, the right side end, and the left side end with respect to the center portion has been described in the above-described exemplary embodiment, the remaining micro emitting lenses may also include at least one of the intervals spaced apart in the downward direction and/or the side direction which may be changed based on a distance or a direction from a center of the second lens part 400 like the above-described FIGS. 13 to 22.

In other words, the plurality of micro emitting lenses 410 of the second lens part 400 may be spaced apart so that at least one of the intervals spaced apart in the downward direction and the side direction based on the distance or the direction from the center portion of the second lens part 400 may be a different interval.

Figure 23:
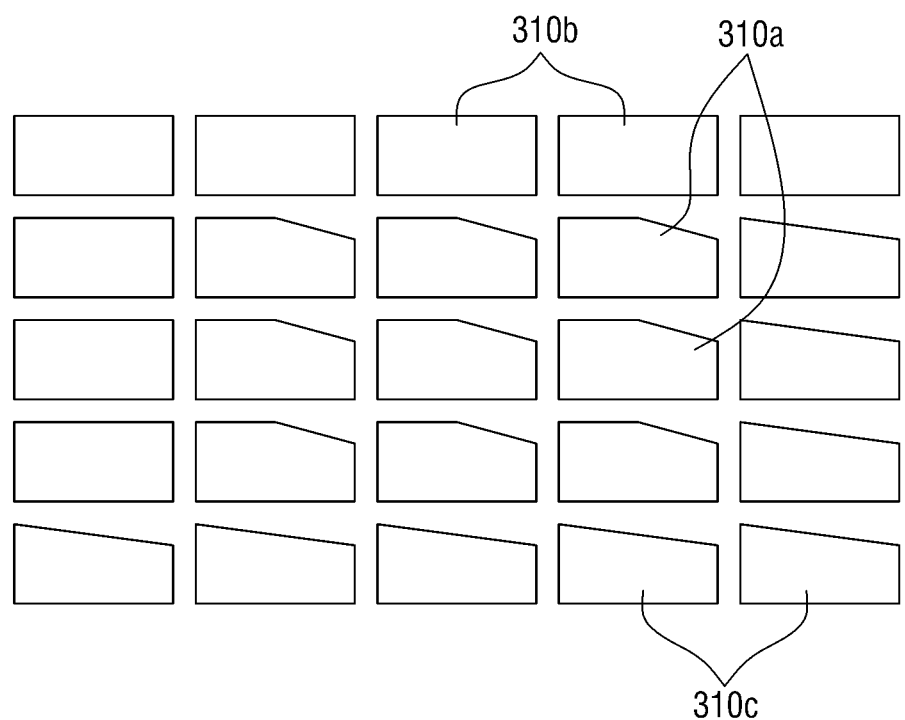
FIG. 23 is a schematic view illustrating a shield part according to the exemplary embodiment of the present disclosure.

Meanwhile, the shield part 300 may include the plurality of shields 310 of the same shape in the above-described exemplary embodiment, but the present disclosure is not limited thereto, and the plurality of shields 310 may form different parts of the beam pattern. For example, as shown in FIG. 23, a part 310a of the plurality of shields 310 may form both a horizontal edge and an inclined edge of the cutoff line, another part 310b may form the horizontal edge of the cutoff line, and still another part 310b may form the inclined edge of the cutoff line.

In the exemplary embodiment of the present disclosure, since the cutoff line may include the horizontal edge and the inclined edge as shown in the above-described FIGS. 9A and 9B, although the plurality of shields 310 may form at least one of the horizontal edge or the inclined edge, the above example is merely an example for aiding understanding of the present disclosure. The plurality of shields 310 may also form the same edge or different edges based on a shape of the cutoff line.

As described above, the lamp for a vehicle 1 of the present disclosure may improve light use efficiency by reducing an area blocked by the shield for forming the cutoff line of the beam pattern, and may reduce the light loss by varying at least one of intervals in a side direction or a downward direction based on a direction in which the light proceeds.

Further, in the above-described exemplary embodiment, the center line C2 of the second lens part 400 may be disposed to be spaced apart in at least one direction among the side direction and the downward direction with respect to the center line C1 of the first lens part 200 to improve light use efficiency by reducing the light blocked for forming the cutoff line of the beam pattern. However, the present disclosure is not limited thereto, and the light axis Ax of the light source 110 may be disposed to be spaced apart in at least one direction among the side direction and the downward direction compared with the center line C1 of the first lens part 200 and the center line C2 of the second lens part 400 to reduce the light blocked for forming the cutoff line of the beam pattern.

Figure 24:
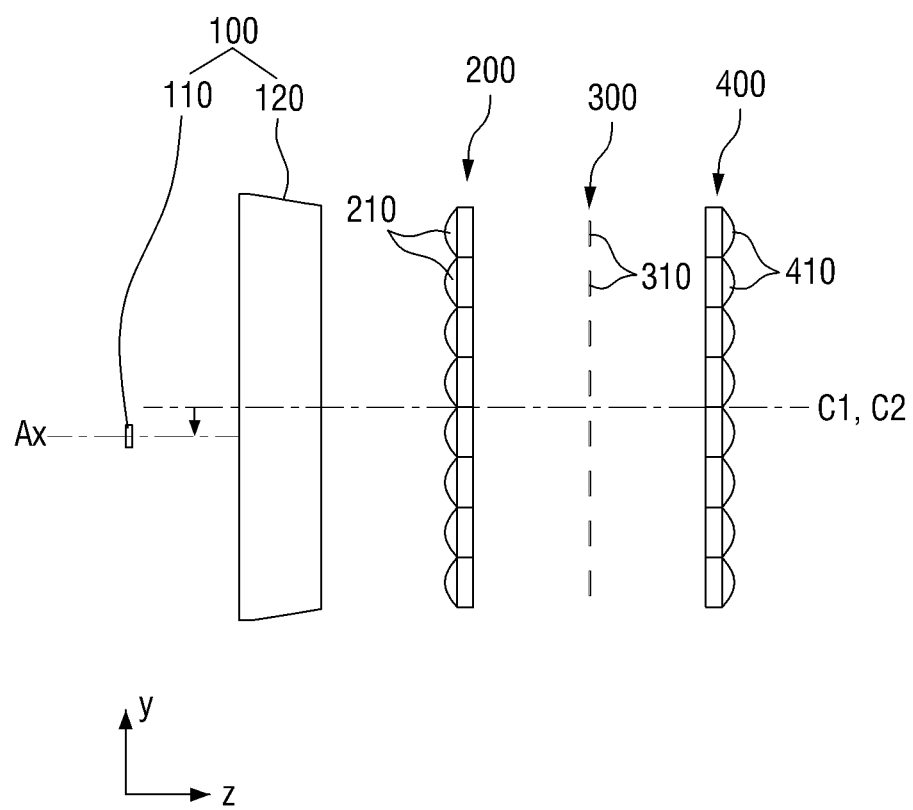
FIG. 24 is a side view illustrating a lamp for a vehicle according to another exemplary embodiment of the present disclosure.
Figure 25:
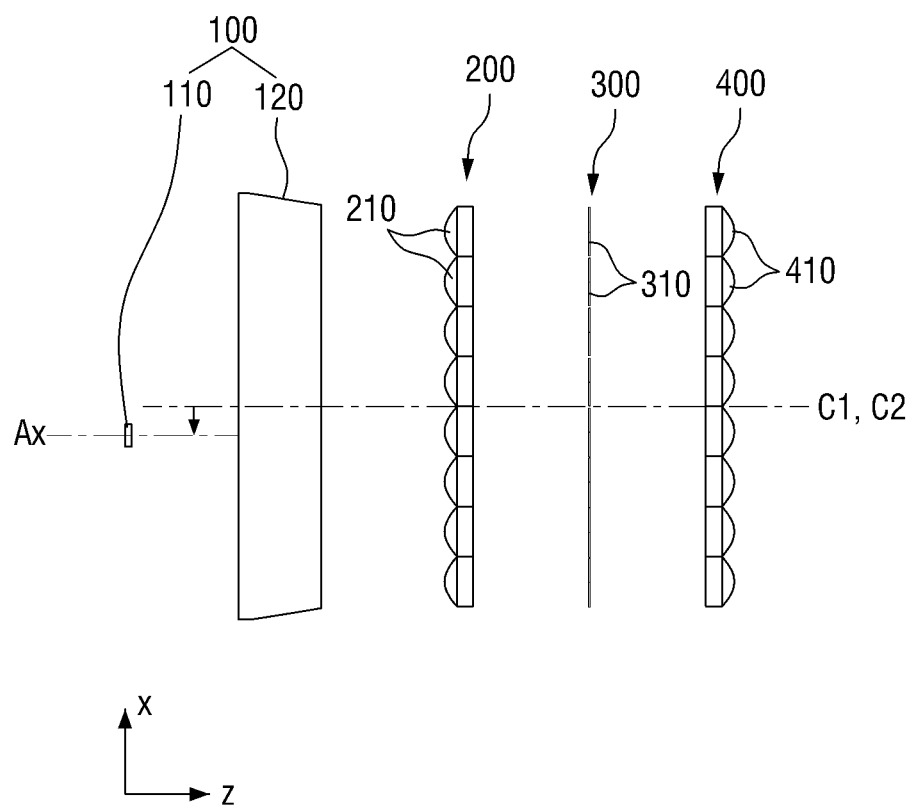
FIG. 25 is a plan view illustrating the lamp for a vehicle according to another exemplary embodiment of the present disclosure.

FIG. 24 is a side view illustrating a lamp for a vehicle according to another exemplary embodiment of the present disclosure, and FIG. 25 is a plan view illustrating the lamp for a vehicle according to another exemplary embodiment of the present disclosure. Referring to FIGS. 24 and 25, a lamp for a vehicle 1 according to another exemplary embodiment of the present disclosure may include a light source part 100, a first lens part 200, a shield part 300, and a second lens part 400 like the above-described exemplary embodiment, the same reference numerals are used for elements configured to perform the same or similar functions as those of the above-described exemplary embodiment, and detailed description of such functions will be omitted.

In another exemplary embodiment of the present disclosure, center lines C1 and C2 of the first lens part 200 and the second lens part 400 may be disposed coincident with each other, and a light axis Ax may be disposed to be spaced apart from the center lines C1 and C2 in at least one of a side direction or a downward direction in a light source 110.

In this case, the light axis Ax of the light source 110 may be disposed to be spaced apart from the center lines C1 and C2 of the first lens part 200 and the second lens part 400 in at least one direction among the side direction and the downward direction to dispose a center of a beam pattern formed by the lamp for a vehicle 1 of the present disclosure to be spaced apart from a vanishing point at which line H-H and line V-V intersect in a side direction and a downward direction as shown in FIG. 9B to reduce light loss by reducing an area blocked by the shield part 300 for forming a cutoff line.

FIG. 24 is an example of a case in which the light axis Ax of the light source 110 is disposed to be spaced apart from the center lines C1 and C2 of the first lens part 200 and the second lens part 400 in the downward direction, and FIG. 25 is an example of a case in which the light axis Ax of the light source 110 is disposed to be spaced apart from the center lines C1 and C2 of the first lens part 200 and the second lens part 400 in the side direction (a right direction).

Figure 26:
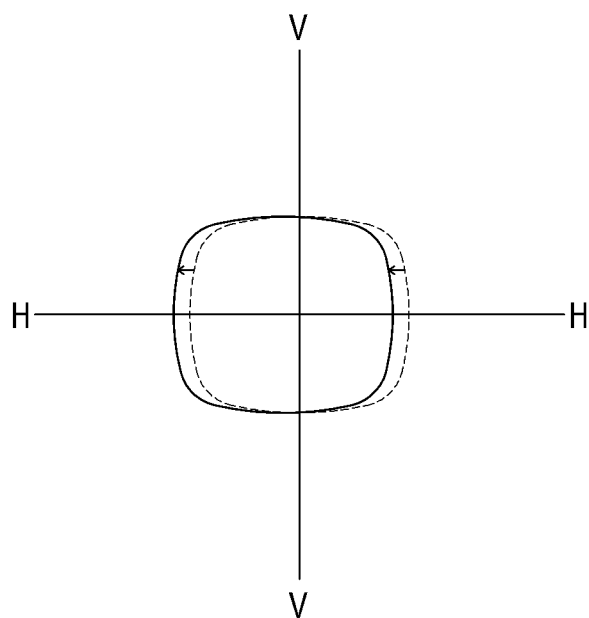
FIGS. 26 and 27 are schematic views illustrating an image of light emitted from a first lens part and a second lens part when a light axis of a light source part according to another exemplary embodiment of the present disclosure is disposed to be spaced apart in a side direction from the light source part.
Figure 27:
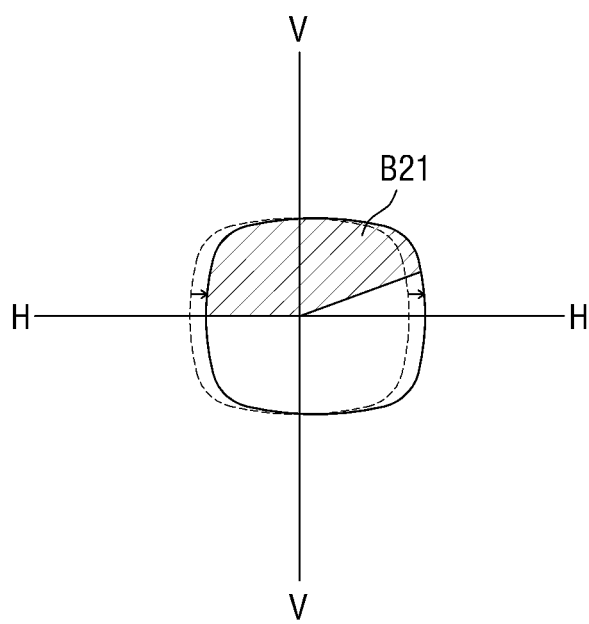

An image of light emitted from the first lens part 200 and the second lens part 400 when the light axis Ax of the light source 110 according to another exemplary embodiment of the present disclosure is disposed to be spaced apart from the center lines C1 and C2 of the first lens part 200 and the second lens part 400 in the side direction will be shown with reference to FIG. 26 and FIG. 27.

FIG. 26 is an example illustrating an image of light emitted from the first lens part 200 when the light axis Ax of the light source 110 is disposed to be spaced apart from the center lines C1 and C2 of the first lens part 200 and the second lens part 400 in a right direction, and the image of the light may be disposed to be spaced apart in a side direction compared with a case in which the light axis Ax of the light source 110 is coincident with center lines C1 and C2 of the first lens part 200 and the second lens part 400.

FIG. 27 is an example illustrating an image of light emitted from the second lens part 400 when the light axis Ax of the light source part 100 is disposed to be spaced apart from the center lines C1 and C2 of the first lens part 200 and the second lens part 400 in a right direction, and the image of the light may be disposed to be spaced apart in a side direction compared with the case in which the light axis Ax of the light source 110 is coincident with the center lines C1 and C2 of the first lens part 200 and the second lens part 400.

In this case, a part B21 of the image of the light emitted from second lens part 400 may be blocked by the shield part 300 to form a cutoff line of a low beam pattern. A dotted line in the above-described FIGS. 26 and 27 shows a beam pattern in a case in which the light axis Ax of the light source 110 is coincident with the center lines C1 and C2 of the first lens part 200 and the second lens part 400. When the light axis Ax of the light source 110 is disposed to be spaced apart from the center lines C1 and C2 of the first lens part 200 and the second lens part 400 in the right direction, since an area B21 in the shield part 300 blocked by the shield part 300 may be relatively decreased, light loss may be reduced. Further, since a center of the beam pattern may be disposed to be spaced apart from the vanishing point at which line H-H and line V-V intersect in the side direction, brightness of the beam pattern may increase and visibility may be improved.

Meanwhile, when the light axis Ax of the light source 110 is disposed to be spaced apart from the center lines C1 and C2 of the first lens part 200 and the second lens part 400 in the right direction, the beam pattern may be known to move in the left direction in FIG. 26 and in the right direction in FIG. 27 since each of lateral sides of light which passes through the first lens part 200 and the second lens part 400 may be shown in a reverse image, and light generated from the light source 110 may move in the right direction in which the light source 110 may be spaced by passing through the first lens part 200 and the second lens part 400.

Figure 28:
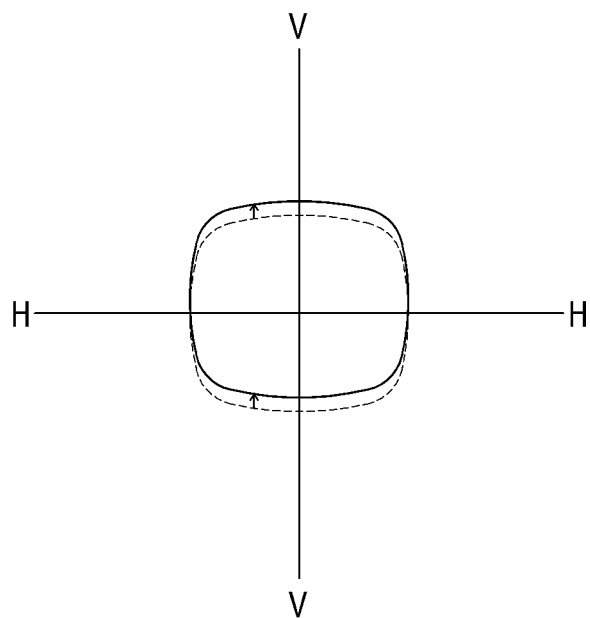
FIGS. 28 and 29 are schematic views illustrating an image of the light emitted from the first lens part and the second lens part when the light axis of the light source part according to another exemplary embodiment of the present disclosure is disposed to be spaced apart in a downward direction from the light source part.
Figure 29:
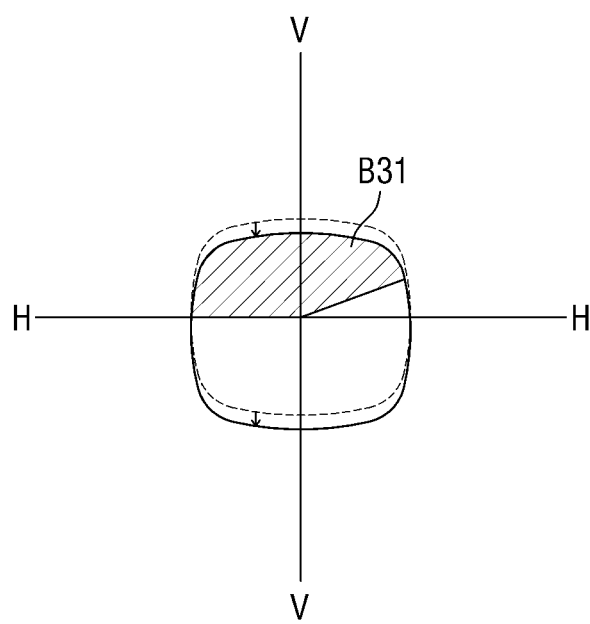

An image of light emitted from the first lens part 200 and the second lens part 400 when the light axis Ax of the light source 110 according to another exemplary embodiment of the present disclosure is disposed to be spaced apart from the center lines C1 and C2 of the first lens part 200 and the second lens part 400 in the downward direction will be shown with reference to FIG. 28 and FIG. 29.

FIG. 28 is an example illustrating an image of light emitted from the first lens part 200 when the light axis Ax of the light source 110 is disposed to be spaced apart from the center lines C1 and C2 of the first lens part 200 and the second lens part 400 in the downward direction, and the image of the light may be disposed to be spaced apart in an upward direction compared with the case in which the light axis Ax of the light source 110 is coincident with the center lines C1 and C2 of the first lens part 200 and the second lens part 400.

FIG. 29 is an example illustrating an image of light emitted from the second lens part 400 when the light axis Ax of the light source 110 is disposed to be spaced apart from the center lines C1 and C2 of the first lens part 200 and the second lens part 400 in a downward direction, and the image of the light may be disposed to be spaced apart in a downward direction compared with the case in which the light axis Ax of the light source 110 is coincident with the center lines C1 and C2 of the first lens part 200 and the second lens part 400.

In this case, a part 31 of the image of the light emitted from second lens part 400 may be blocked by the shield part 300 to form a cutoff line of a low beam pattern.

A dotted line in the above-described FIGS. 28 and 29 shows a beam pattern in a case in which the light axis Ax of the light source 110 is coincident with the center lines C1 and C2 of the first lens part 200 and the second lens part 400. When the light axis Ax of the light source 110 is disposed to be spaced apart from the center lines C1 and C2 of the first lens part 200 and the second lens part 400 in the downward direction, since an area B31 in the shield part 300 blocked by the shield part 300 may be relatively decreased, the light loss may be reduced. Further, since a center of the beam pattern may be disposed to be spaced apart from the vanishing point at which line H-H and line V-V intersect in the downward direction, the brightness of the beam pattern may increase and the view may be improved.

Meanwhile, when the light axis Ax of the light source 110 is disposed to be spaced apart from the center lines C1 and C2 of the first lens part 200 and the second lens part 400 in the downward direction, the beam pattern may be known to move in the upward direction in FIG. 28 and in the downward direction in FIG. 29 since each of vertical sides of light which passes through the first lens part 200 and the second lens part 400 may be shown in a reverse image, and the light generated from the light source 110 may move in the downward direction in which the light source 110 is spaced by passing through the first lens part 200 and the second lens part 400.

In another exemplary embodiment of the present disclosure, when the light axis Ax of the light source 110 is disposed to be spaced apart from the center lines C1 and C2 of the first lens part 200 and the second lens part 400 in the side direction, light which passes through the micro incidence lens 210 may be incident not only on a corresponding micro emitting lens 410 but also on other adjacent micro emitting lenses, and thus a light irradiation range in the side direction may be expanded.

Figure 30:
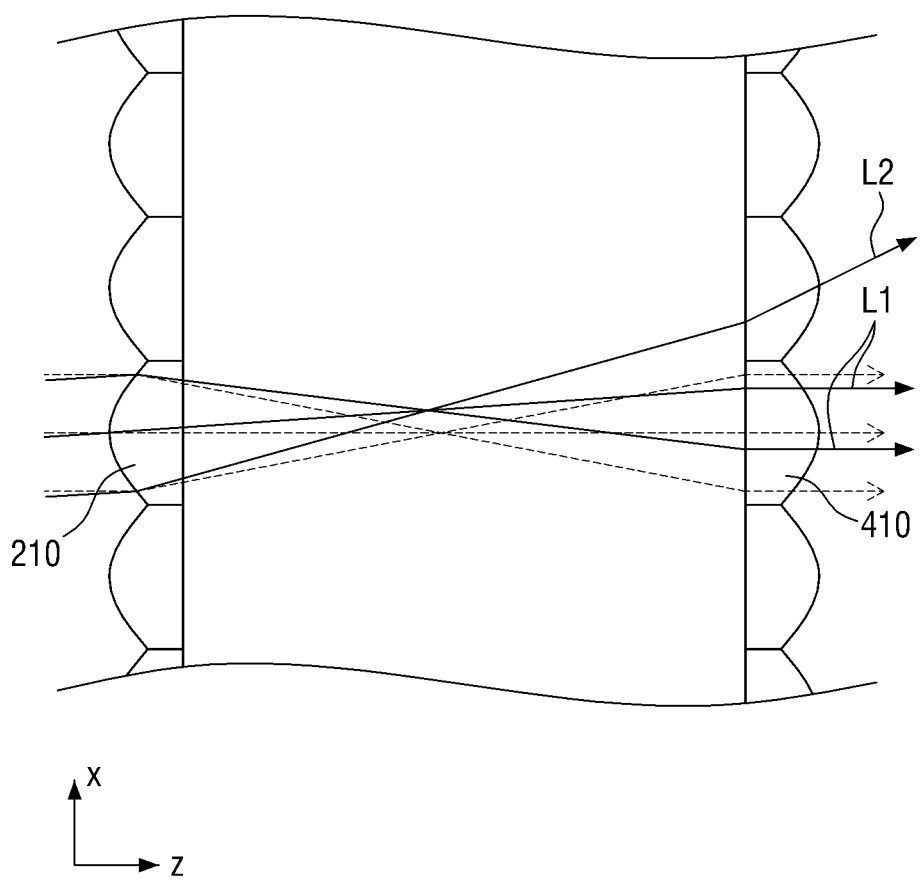
FIG. 30 is a schematic view illustrating a light path of each of the first lens part and the second lens part when the light axis of the light source part according to another exemplary embodiment of the present disclosure is disposed to be spaced apart in the side direction from the light source part.

In particular, when the light axis Ax of the light source 110 and the center lines C1 and C2 of the first lens part 200 and the second lens part 400 are coincident with each other, light incident on the plurality of micro incidence lenses 210 may be incident on a plurality of corresponding micro emitting lenses 410 by proceeding in parallel with the light axis Ax of the light source part 100. Conversely, when the light axis Ax of the light source 110 is disposed to be spaced apart from the center lines C1 and C2 of the first lens part 200 and the second lens part 400 in the side direction, since the light incident on the plurality of micro incidence lenses 210 is incident on the micro incidence lens 210 with a predetermined angle in the side direction with respect to the center axis Ax1, as shown in FIG. 30, although some L1 of the light incident on the micro incidence lenses 210 may be incident on the corresponding micro emitting lenses 410, the remaining light (L2) may be incident on other micro emitting lenses adjacent to the micro emitting lenses 410.

Figure 31:
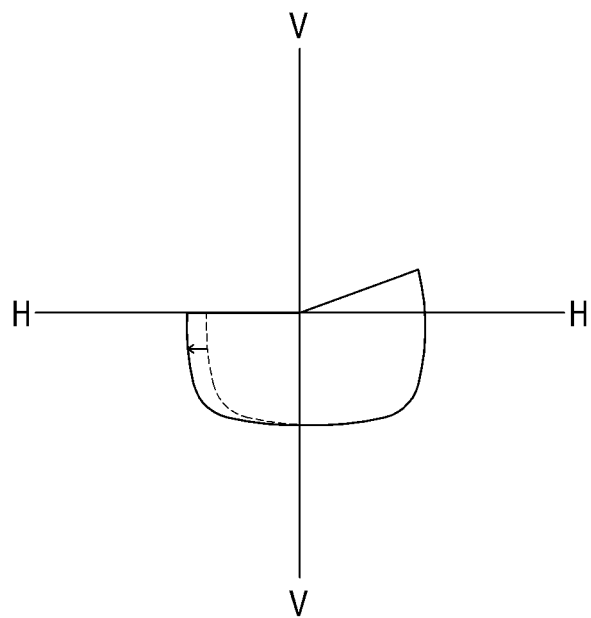
FIG. 31 is a schematic view illustrating a beam pattern based on the light path in FIG. 30.

In this case, a light irradiation range emitted from the lamp for a vehicle 1 of the present disclosure may be further expanded in the side direction by the light incident on other micro emitting lenses adjacent to the corresponding micro emitting lenses 410. Accordingly, when the light axis Ax of the light source 110 and the center lines C1 and C2 of the first lens part 200 and the second lens part 400 are coincident with each other, the light irradiation range may be further expanded in the side direction compared with a path through which light proceeds (a dotted line) and thus the visibility may be improved. Accordingly, as shown in FIG. 31, a spread area of the beam pattern formed by the lamp for a vehicle 1 of the present disclosure may be expanded to secure a wider view.

As described above, in the lamp for a vehicle 1 of the present disclosure, one of the light axis Ax of the light source 110, the center line C1 of the first lens part 200, or the center line C2 of the second lens part 400 may be disposed to be spaced apart from others in at least one of the side direction or the downward direction to reduce the light loss by reducing the area blocked to form the cutoff line of the beam pattern, and to increase the brightness of the beam pattern, and thereby improving the visibility by preventing blockage of a center of the beam pattern that includes high brightness.

The above-described lamp for a vehicle of the present disclosure may achieve at least one of the following effects. Since a beam pattern may be formed to move in at least one of a side direction or a downward direction, an area blocked to form a cutoff line of the beam pattern may be reduced, and thus the light loss may be reduced. Further, since the beam pattern may be formed to move in at least one of the side direction or the downward direction, a visibility may be improved since blocking of a center of the beam pattern that includes high brightness may be prevented, and thus brightness of the beam pattern may be increased. It should be noted that effects of the present disclosure are not limited to the above-mentioned effects, and other effects of the present disclosure will be apparent to those skilled in the art from descriptions in the claim.

Those skilled in the art of the present disclosure may understand that the present disclosure may be embodied in other specific forms without changing the technical spirit or essential characteristics. Accordingly, the above described exemplary embodiments should be understood to be exemplary and not limiting. The scope of the present disclosure is shown by the claims rather than the detailed description, and all of variations or different forms derived from the means, scope, and equivalents of the claims should be interpreted to be included in the scope of the present disclosure.

What is claimed is:

1. A lamp for a vehicle, comprising:
a light source part including a light source;
a first lens part including a plurality of micro incidence lenses on which light generated from the light source part is incident;
a second lens part including a plurality of micro emitting lenses each corresponding to each of the plurality of micro incidence lenses; and
a shield part disposed between the first lens part and the second lens part, wherein the shield part includes a plurality of shields configured to block some of the light incident from the plurality of micro incidence lenses on the plurality of micro emitting lenses and to form a predetermined beam pattern,
wherein a center line which connects centers of an incidence surface and an emitting surface of the second lens part is disposed to be spaced apart from a center line which connects centers of an incidence surface and an emitting surface of the first lens part in a side direction and a downward direction to prevent a central region of the light emitted from the first lens part from being blocked by the shield part, and
wherein a center line of the shield part is spaced apart from the center line of the first lens part.

2. The lamp of claim 1, wherein a micro emitting lens disposed at a center portion of the second lens part among the plurality of micro emitting lenses is disposed to be spaced apart from the center line of the first lens part in the side direction and the downward direction at a predetermined interval.

3. The lamp of claim 1, wherein a center line of each of the plurality of micro emitting lenses is spaced apart from a center line of corresponding micro incidence lens among the plurality of micro incidence lenses by an interval that varies based on at least one of a distance or a direction from a center portion of the second lens part.

4. The lamp of claim 3, wherein a micro emitting lens disposed to be spaced upward from the center portion of the second lens part among the plurality of micro emitting lenses is spaced apart by an interval smaller than a predetermined interval in the downward direction as the distance from the center portion of the second lens part increases.

5. The lamp of claim 3, wherein a micro emitting lens disposed to be spaced downward from the center portion of the second lens part among the plurality of micro emitting lenses is spaced apart by an interval greater than a predetermined interval in the downward direction as the distance from the center portion of the second lens part increases.

6. The lamp of claim 3, wherein, in a micro emitting lens disposed to be spaced apart from the center portion of the second lens part in a side direction among the plurality of micro emitting lenses, a distance spaced apart in the side direction becomes smaller than a predetermined interval as the distance from the center portion of the second lens part increases toward one side, and the distance spaced apart in the side direction becomes greater than the predetermined interval as the distance from the center portion of the second lens part increases toward the other side.

7. The lamp of claim 1, wherein each of the plurality of shields is displaced in at least one of the side direction or the downward direction with respect to the center line of the first lens part.

8. The lamp of claim 1, wherein some of the plurality of shields include shapes different from shapes of other shields to form different areas of the beam pattern.

9. The lamp of claim 1, wherein the light source part further includes a light guide part configured to guide the light generated from the light source to the first lens part, and wherein the light guide part adjusts a light path to allow the light generated from the light source to proceed in parallel with a light axis of the light source.

10. The lamp of claim 9, wherein the light guide part includes a collimator lens configured to convert the light generated from the light source to parallel light.

11. The lamp of claim 1, wherein at least one of the plurality of micro incidence lenses or the plurality of micro emitting lenses is a lens of a semi-cylindrical shape which extends in one direction.

12. A lamp for a vehicle, comprising:
a light source part including a light source;
a first lens part including a plurality of micro incidence lenses on which light generated from the light source part is incident;
a second lens part including a plurality of micro emitting lenses each corresponding to each of the plurality of micro incidence lenses; and
a shield part disposed between the first lens part and the second lens part, wherein the shield part includes a plurality of shields configured to block some of the light incident from the plurality of micro incidence lenses on the plurality of micro emitting lenses,
wherein a center line of each of the plurality of micro emitting lenses is spaced apart from a center line of corresponding micro incidence lens among the plurality of micro incidence lenses in a side direction, a downward direction, or both by an interval that varies based on at least one of a distance or a direction from a center portion of the second lens part.

* * * * *